United States Patent
Yu et al.

(10) Patent No.: US 10,935,656 B2
(45) Date of Patent: Mar. 2, 2021

(54) VEHICLE RADAR DEVICE AND SYSTEM THEREOF

(71) Applicants: CUB ELECPARTS INC., Changhua County (TW); CUBTEK INC., Hsinchu County (TW)

(72) Inventors: San-Chuan Yu, Changhua County (TW); Yuan-Tung Hung, Changhua County (TW); Kou-Ting Lee, Changhua County (TW)

(73) Assignees: CUB ELECPARTS INC., Changhua County (TW); CUBTEK INC., Hsinchu County (TW)

( * ) Notice: Subject to any disclaimer, the term of this patent is extended or adjusted under 35 U.S.C. 154(b) by 50 days.

(21) Appl. No.: 16/505,728

(22) Filed: Jul. 9, 2019

(65) Prior Publication Data
US 2020/0249343 A1 Aug. 6, 2020

(30) Foreign Application Priority Data
Feb. 1, 2019 (TW) .................. 108104305

(51) Int. Cl.
*H01Q 1/32* (2006.01)
*G01S 13/93* (2020.01)
*G01S 7/40* (2006.01)

(52) U.S. Cl.
CPC ............ *G01S 13/93* (2013.01); *G01S 7/4026* (2013.01); *H01Q 1/3291* (2013.01); *G01S 2007/4034* (2013.01)

(58) Field of Classification Search
CPC .......................... H01G 1/3291; H01G 1/3233
See application file for complete search history.

(56) References Cited

U.S. PATENT DOCUMENTS

2014/0306846 A1* 10/2014 Nakatsu ................ H01Q 21/30
343/700 MS

* cited by examiner

*Primary Examiner* — Graham P Smith
(74) *Attorney, Agent, or Firm* — CKC & Partners Co., LLC

(57) ABSTRACT

A vehicle radar device includes a radar control unit, a first antenna array, a second antenna array, a first circuit board and a second circuit board. The first antenna array is communicatively connected to the radar control unit. The first antenna array includes a plurality of first transmitting elements and a plurality of first receiving elements. The second antenna array is communicatively connected to the radar control unit. The second antenna array includes a plurality of second transmitting elements and a plurality of second receiving elements. The first antenna array is a plurality of circuit board antennas and disposed on the first circuit board. The second antenna array is a plurality of circuit board antennas and disposed on the second circuit board.

20 Claims, 13 Drawing Sheets

VEHICLE RADAR DEVICE AND SYSTEM THEREOF

RELATED APPLICATIONS

This application claims priority to Taiwan Application Serial Number 108104305, filed Feb. 1, 2019, which is herein incorporated by reference.

BACKGROUND

Technical Field

The present disclosure relates to a vehicle radar device and a vehicle radar system. More particularly, the present disclosure relates to a vehicle radar device and a vehicle radar system both including two antenna arrays.

Description of Related Art

With the rapid developments of advanced driver assistance system (ADAS) and autopilot technology, vehicles are often required to be equipped with a large number of detection devices or sensing devices to achieve the relevant functions, and thereby the application requirements of the vehicle radar devices are more and more. However, from the vehicle manufacturer's point of view, the configuration of the large number of detection devices is result in increasing the complexity of electronic system design and whole vehicle assembling. From the consumers point of view, if the large number of detection devices of aftermarket (AM) types are equipped, it would raise the complexity of the human interface or the connection interface, and the various functions from the multiple detection devices cannot be effectively separated or can cause interference issues.

Give the above, there is an urgent need for an integrated solution of a vehicle detection device or a vehicle radar device, which is featured with effectively reducing device number and complexity, in today's market.

SUMMARY

According to one aspect of the present disclosure, a vehicle radar device includes a radar control unit, a first antenna array, a second antenna array, a first circuit board and a second circuit board. The first antenna array is communicatively connected to the radar control unit. The first antenna array includes a plurality of first transmitting elements and a plurality of first receiving elements. The second antenna array is communicatively connected to the radar control unit. The second antenna array includes a plurality of second transmitting elements and a plurality of second receiving elements. The first antenna array is a plurality of circuit board antennas and disposed on the first circuit board. The second antenna array is a plurality of circuit board antennas and disposed on the second circuit board. When an angle between the first circuit board and the second circuit board is P12, the following condition is satisfied: 60 degrees≤P12<180 degrees.

According to another aspect of the present disclosure, a vehicle radar system is disposed in a vehicle and includes at least one vehicle radar device. The vehicle radar device includes a radar control unit, a first transceiver unit and a second transceiver unit. The first transceiver unit is communicatively connected to the radar control unit and includes a first antenna array, which includes a plurality of first transmitting elements and a plurality of first receiving elements. The second transceiver unit is communicatively connected to the radar control unit and includes a second antenna array, which includes a plurality of second transmitting elements and a plurality of second receiving elements. When an angle between a centerline of a horizontal main lobe of the first transmitting elements and a centerline of a horizontal main lobe of the second transmitting elements is T12, and an angle between a centerline of a horizontal main lobe of the first receiving elements and a centerline of a horizontal main lobe of the second receiving elements is R12, the following conditions are satisfied: 0 degrees<T12≤90 degrees; and 0 degrees<R12≤90 degrees.

According to another aspect of the present disclosure, a vehicle radar system is disposed in a vehicle and includes at least one vehicle radar device, which is disposed at one of four corners of the vehicle. The vehicle radar device includes a radar control unit, a first antenna array, a second antenna array, a first circuit board and a second circuit board. The first antenna array is communicatively connected to the radar control unit. The second antenna array is communicatively connected to the radar control unit. The first circuit board is vertical to a horizontal direction of the vehicle. The first antenna array is a plurality of circuit board antennas and disposed on the first circuit board. The second circuit board is vertical to the horizontal direction of the vehicle. The second antenna array is a plurality of circuit board antennas and disposed on the second circuit board. When an angle between the first circuit board and the second circuit board is P12, the following condition is satisfied: 90 degrees≤P12<180 degrees.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
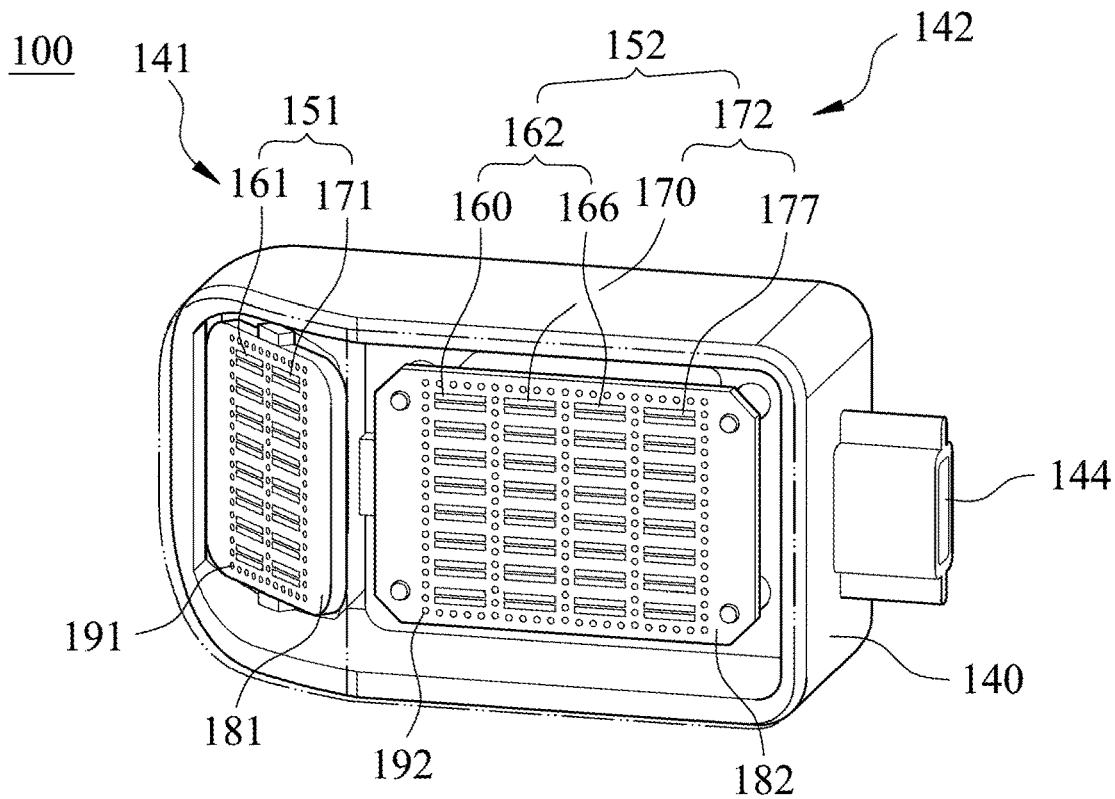
FIG. 1A is a schematic view of a vehicle radar device according to the 1st embodiment of the present disclosure.
Figure 1B:
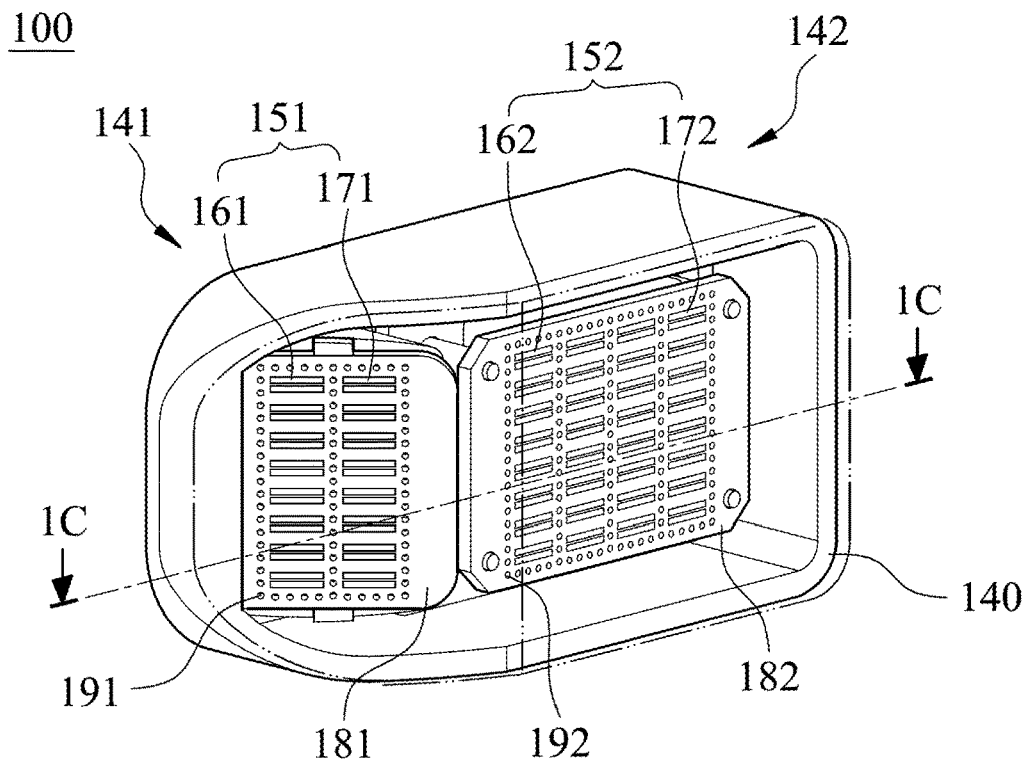
FIG. 1B is another schematic view of the vehicle radar device according to the 1st embodiment.
Figure 1C:
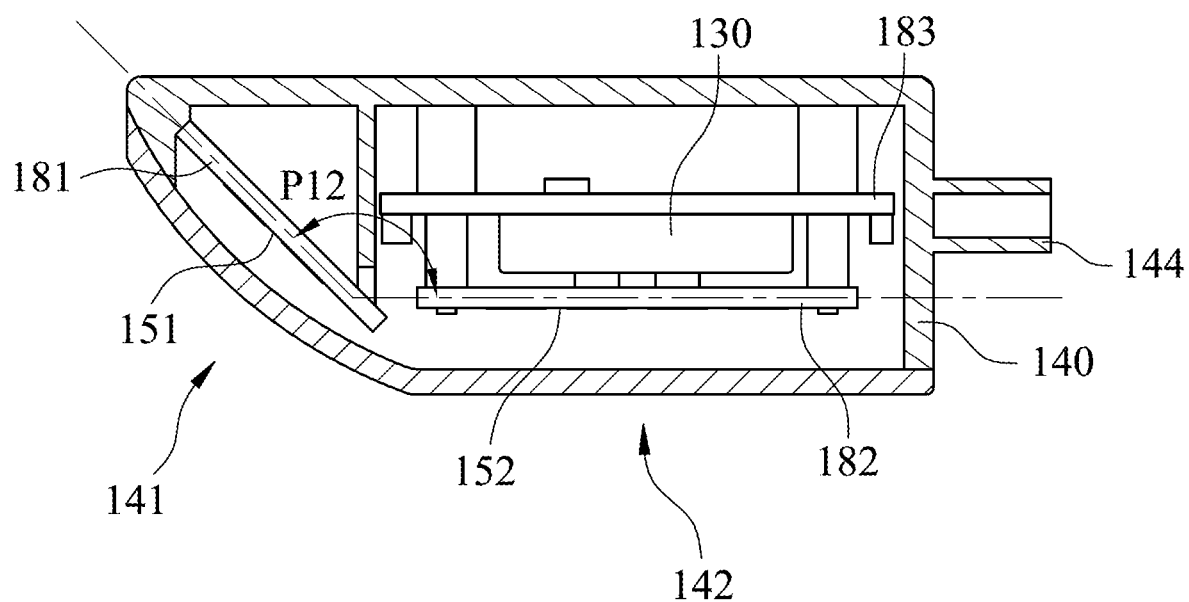
FIG. 1C is a cross-sectional view along line 1C-1C of FIG. 1B.
Figure 1D:
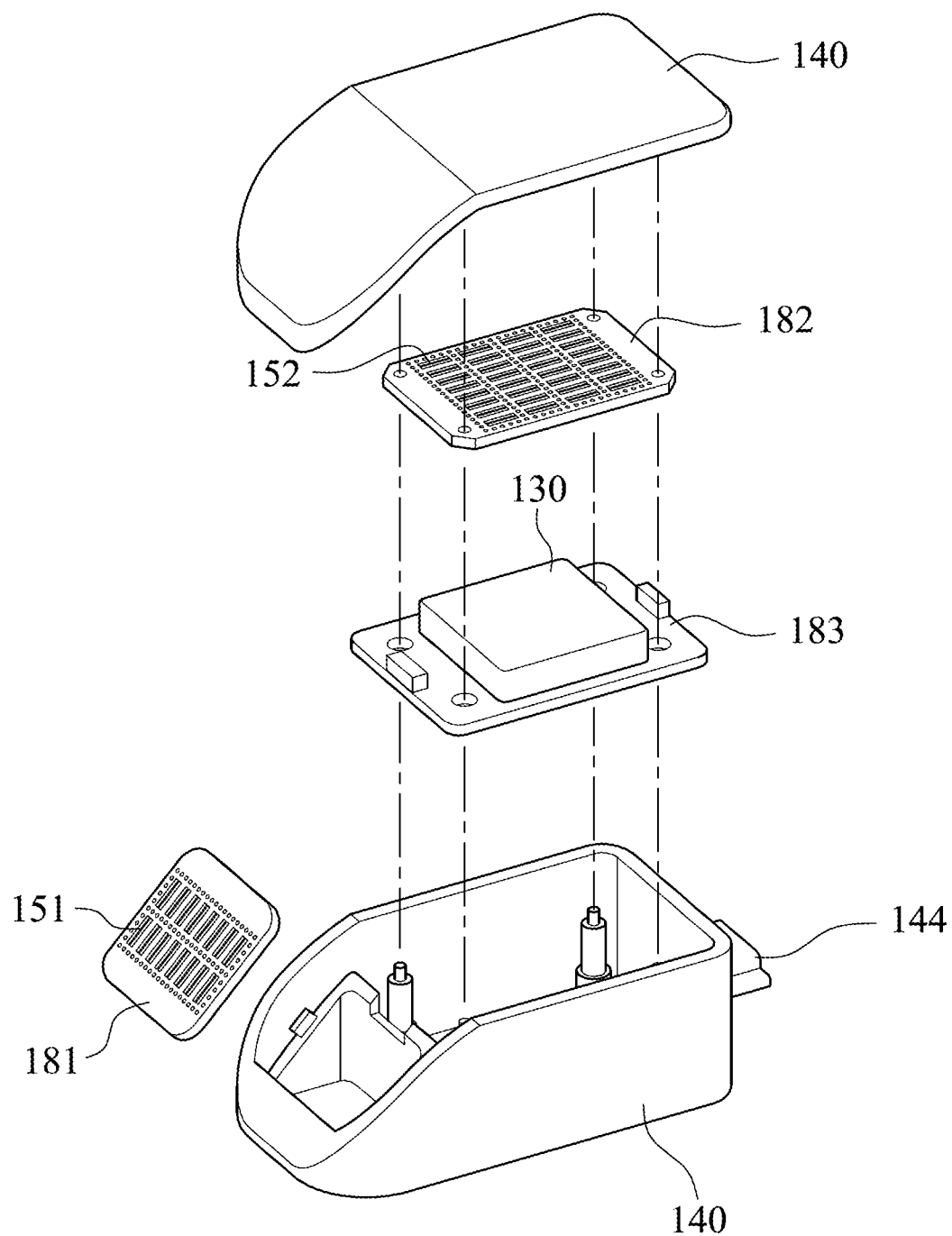
FIG. 1D is an exploded view of the vehicle radar device according to the 1st embodiment.

FIG. 1A is a schematic view of a vehicle radar device 100 according to the 1st embodiment of the present disclosure, FIG. 1B is another schematic view of the vehicle radar device 100 according to the 1st embodiment, FIG. 1C is a cross-sectional view along line 1C-1C of FIG. 1B, and FIG. 1D is an exploded view of the vehicle radar device 100 according to the 1st embodiment. In FIG. 1A to FIG. 1D, the vehicle radar device 100 includes a radar control unit 130, a first antenna array 151, a second antenna array 152, a first circuit board 181 and a second circuit board 182.

The first antenna array 151 is communicatively connected to the radar control unit 130. The first antenna array 151 includes a plurality of first transmitting elements 161 and a plurality of first receiving elements 171. That is, the first transmitting elements 161 are first transmitting radiating elements, and the first receiving elements 171 are first receiving radiating elements. The first antenna array 151 is a plurality of circuit board antennas and disposed on the first circuit board 181. The second antenna array 152 is communicatively connected to the radar control unit 130. The second antenna array 152 includes a plurality of second transmitting elements 162 and a plurality of second receiving elements 172. That is, the second transmitting elements 162 are second transmitting radiating elements, and the second receiving elements 172 are second receiving radiating elements. The second antenna array 152 is a plurality of circuit board antennas and disposed on the second circuit board 182. When an angle between the first circuit board 181 and the second circuit board 182 is P12, the following condition is satisfied: 60 degrees≤P12<180 degrees. Accordingly, the first antenna array 151 and the second antenna array 152, which are two non-coplanar antenna arrays, are advantageous in providing detections with various directions and various antenna radiation patterns in accordance with various application requirements. Furthermore, the following condition may be satisfied: 90 degrees≤P12<180 degrees. Moreover, the following condition may be satisfied: 120 degrees≤P12≤150 degrees. In the 1st embodiment, the angle P12 between the first circuit board 181 and the second circuit board 182 is 135 degrees.

In FIG. 1C, the vehicle radar device 100 may further include a third circuit board 183. The radar control unit 130 is disposed on the third circuit board 183. Only one of the first circuit board 181 and the second circuit board 182 (specifically only the second circuit board 182 in the 1st embodiment) is parallel to the third circuit board 183. Accordingly, it is beneficial to the vehicle radar device 100 to achieve a compact size. In an embodiment according to the present disclosure, each of a first circuit board, a second circuit board and a third circuit board may be a printed circuit board (PCB), a flexible printed circuit board, or a ceramic circuit board, but not limited thereto.

An operating frequency of the first antenna array 151 and an operating frequency of the second antenna array 152 may be both greater than 10 GHz. Furthermore, the operating frequency of the first antenna array 151 and the operating frequency of the second antenna array 152 may be both greater than 10 GHz and smaller than 300 GHz. Moreover, the operating frequency of the first antenna array 151 and the operating frequency of the second antenna array 152 may be both 24 GHz+/−5 GHz, 77 GHz+/−5 GHz, or 79 GHz+/−5 GHz. Each of the first transmitting elements 161, each of the first receiving elements 171, each of the second transmitting elements 162 and each of the second receiving elements 172 is a microstrip antenna and has a length smaller than 40 mm. The aforementioned microstrip antenna may be in a microstrip (strip or rectangular) shape, in a patch shape, in a comb shape, or a microstrip slot, but not limited thereto. Furthermore, each of the first transmitting elements 161, each of the first receiving elements 171, each of the second transmitting elements 162 and each of the second receiving elements 172 is the microstrip antenna and may have the length smaller than 30 mm. Moreover, each of the first transmitting elements 161, each of the first receiving elements 171, each of the second transmitting elements 162 and each of the second receiving elements 172 is the microstrip antenna and may have the length smaller than 20 mm and greater than 0.2 mm. Therefore, the vehicle radar device 100 being a millimeter wave radar device is advantageous in reducing the number of the vehicle radar device 100 and maintaining the same applications and functions. The second transmitting elements 162 may be a plurality of second narrow-angle transmitting elements 160 and a plurality of second wide-angle transmitting elements 166, and the radar control unit 130 is for switching the second narrow-angle transmitting elements 160 or the second wide-angle transmitting elements 166 to operate. The second receiving elements 172 may be a plurality of second narrow-angle receiving elements 170 and a plurality of second wide-angle receiving elements 177, and the radar control unit 130 is for switching the second narrow-angle receiving elements 170 or the second wide-angle receiving elements 177 to operate. Therefore, it is beneficial to enlarge the detection range of the second antenna array 152. In addition, a transmitting circuit communicatively connected to the second narrow-angle transmitting elements 160 and a transmitting circuit communicatively connected to the second wide-angle transmitting elements 166 may be separated or the same one to operate by switching. A receiving circuit communicatively connected to the second narrow-angle receiving elements 170 and a receiving circuit communicatively connected to the second wide-angle receiving elements 177 may be separated or the same one to operate by switching.

Specifically, the operating frequency of the first antenna array 151 and the operating frequency of the second antenna array 152 are both about 77 GHz or 79 GHz. Relative permittivity at the operating frequency of the first circuit board 181, the second circuit board 182 and the third circuit board 183 may be in a range of 2.0 to 4.3. Furthermore, the relative permittivity at the operating frequency of the first circuit board 181, the second circuit board 182 and the third circuit board 183 may be in a range of 2.2 to 3.8. Moreover, a dimension of the first circuit board 181 may be at least 19 mm×20 mm×1.4 mm (thickness), and a dimension of the second circuit board 182 may be at least 30 mm×20 mm×1.4 mm (thickness). The first circuit board 181 and the second circuit board 182 respectively include a plurality of through holes 191 and 192, which are properly configured and have electrical conductivity. The first circuit board 181, the second circuit board 182 and the third circuit board 183 may be communicatively connected by flexible flat cables (FFC), with the numbers of the conductive wires and the space sizes according to the demands. The flexible flat cables may be made of thermoplastic organic LCP (Liquid Crystal Polymers) materials to act as high frequency and high speed flexible circuit boards with high reliability. The LCP materials featured with superior electrical properties are advantageous in being applicable to millimeter wave, and the LCP materials featured with small coefficient of thermal expansion can act as ideal package materials for high frequency and high speed product. In addition, the first circuit board 181, the second circuit board 182 and the third circuit board 183 are all disposed in a housing 140, which includes a connector 144.

In FIG. 1A and FIG. 1B, each of the first transmitting elements 161 is a rectangular microstrip slot antenna, i.e. a radiating slot, which is formed by a slot of a conductive layer on one surface of the first circuit board 181 and has a dimension about 3.2 mm (length)×0.5 mm (width). The first transmitting elements 161 are arranged along a width direction. For example, the first transmitting elements 161 may be arranged as a slot array antenna of an array of 1×16. A dimension of the slot array antenna formed by the sixteen first transmitting elements 161 is about 3.2 mm×17.6 mm. Based on demands, one of the first transmitting elements 161 may be communicatively connected to another thereof by at least one of a series connection and a parallel connection, and the first transmitting elements 161 have at least one feeding port. Each of the first receiving elements 171 is a rectangular microstrip slot antenna and has a dimension about 3.2 mm (length)×0.5 mm (width). The first receiving elements 171 are arranged along a width direction. Based on demands, one of the first receiving elements 171 may be communicatively connected to another thereof by at least one of a series connection and a parallel connection, and the first receiving elements 171 have at least one feeding port. Each of the second narrow-angle transmitting elements 160 is a rectangular microstrip slot antenna and has a dimension about 3.2 mm (length)×0.5 mm (width). The second narrow-angle transmitting elements 160 are arranged along a width direction. Based on demands, one of the second narrow-angle transmitting elements 160 may be communicatively connected to another thereof by at least one of a series connection and a parallel connection, and the second narrow-angle transmitting elements 160 have at least one feeding port. Each of the second wide-angle transmitting elements 166 is a rectangular microstrip slot antenna and has a dimension about 3.2 mm (length)×0.5 mm (width). The second wide-angle transmitting elements 166 are arranged along a width direction. Based on demands, one of the second wide-angle transmitting elements 166 may be communicatively connected to another thereof by at least one of a series connection and a parallel connection, and the second wide-angle transmitting elements 166 have at least one feeding port. Each of the second narrow-angle receiving elements 170 is a rectangular microstrip slot antenna and has a dimension about 3.2 mm (length)×0.5 mm (width). The second narrow-angle receiving elements 170 are arranged along a width direction. Based on demands, one of the second narrow-angle receiving elements 170 may be communicatively connected to another thereof by at least one of a series connection and a parallel connection, and the second narrow-angle receiving elements 170 have at least one feeding port. Each of the second wide-angle receiving elements 177 is a rectangular microstrip slot antenna and has a dimension about 3.2 mm (length)×0.5 mm (width). The second wide-angle receiving elements 177 are arranged along a width direction. Based on demands, one of the second wide-angle receiving elements 177 may be communicatively connected to another thereof by at least one of a series connection and a parallel connection, and the second wide-angle receiving elements 177 have at least one feeding port. Furthermore, the series connections, the parallel connections and the feeding ports recited in this paragraph can be configured according to demands and thereby are not specifically shown in the drawings.

In an embodiment according to the present disclosure (not shown in drawings), a dimension of the first circuit board and a dimension of the second circuit board may be greater than the dimensions thereof recited in the aforementioned 1st embodiment. For example, the dimension of the first circuit board may be 38 mm×40 mm×1.4 mm (thickness), the dimension of the second circuit board may be 60 mm×40 mm×1.4 mm (thickness), and a number of each of first transmitting elements, first receiving elements, second narrow-angle transmitting elements, second wide-angle transmitting elements, second narrow-angle receiving elements and second wide-angle receiving elements may be greater than the number thereof recited in the aforementioned 1st embodiment.

Figure 2:
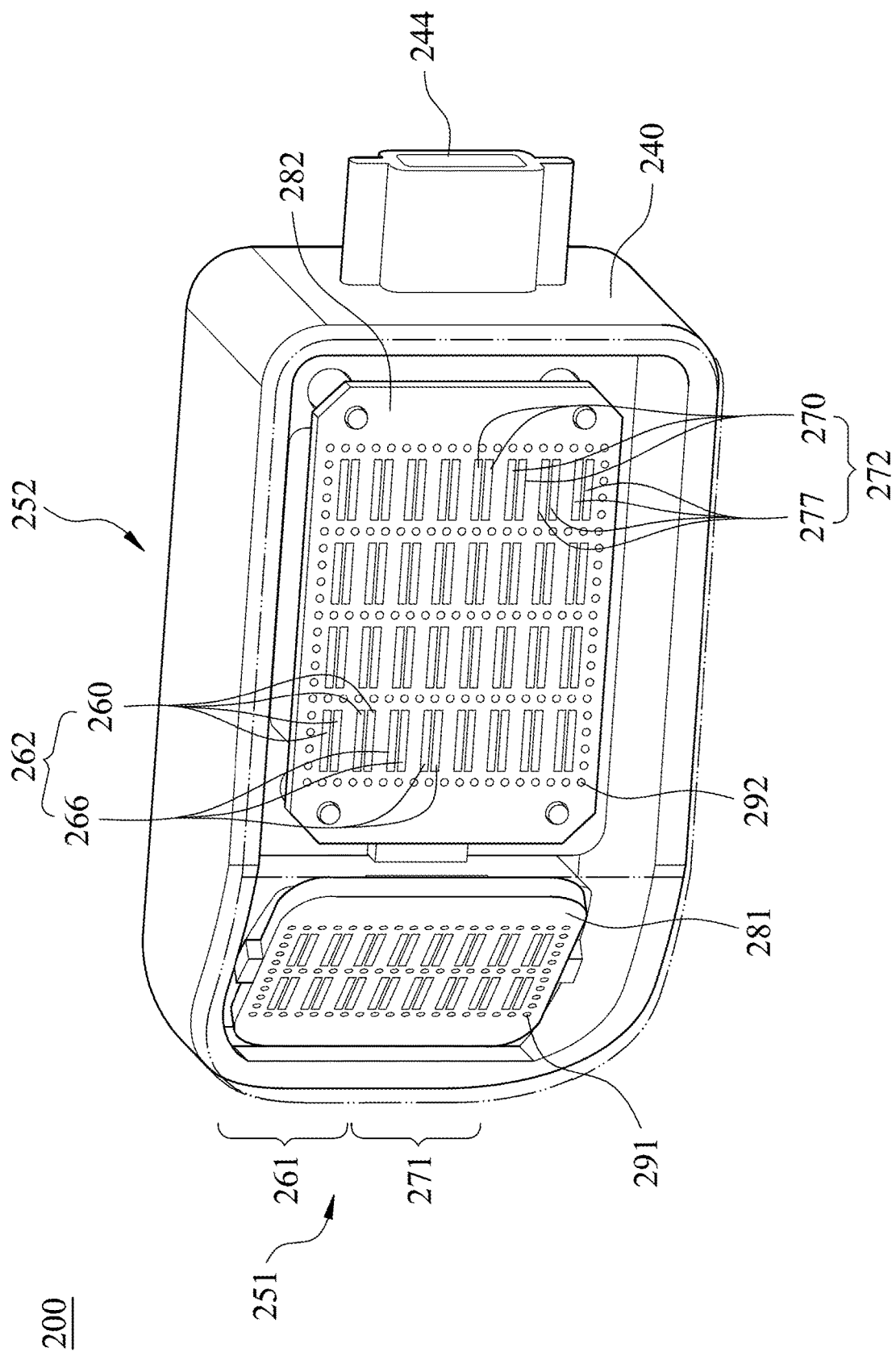
FIG. 2 is a schematic view of a vehicle radar device according to the 2nd embodiment of the present disclosure.

FIG. 2 is a schematic view of a vehicle radar device 200 according to the 2nd embodiment of the present disclosure. In FIG. 2, the vehicle radar device 200 includes a radar control unit (not shown in FIG. 2), a first antenna array 251, a second antenna array 252, a first circuit board 281 and a second circuit board 282. The first antenna array 251 is communicatively connected to the radar control unit. The first antenna array 251 includes a plurality of first transmitting elements 261 and a plurality of first receiving elements 271. The first antenna array 251 is a plurality of circuit board antennas and disposed on the first circuit board 281. The second antenna array 252 is communicatively connected to the radar control unit. The second antenna array 252 includes a plurality of second transmitting elements 262 and a plurality of second receiving elements 272. The second transmitting elements 262 are a plurality of second narrow-angle transmitting elements 260 and a plurality of second wide-angle transmitting elements 266. The second receiving elements 272 are a plurality of second narrow-angle receiving elements 270 and a plurality of second wide-angle receiving elements 277. The second antenna array 252 is a plurality of circuit board antennas and disposed on the second circuit board 282. An angle P12 between the first circuit board 281 and the second circuit board 282 is 135 degrees. In addition, the first circuit board 281 and the second circuit board 282 respectively include a plurality of through holes 291 and 292, which are properly configured and have electrical conductivity. The first circuit board 281, the second circuit board 282 and the third circuit board (not shown in drawings) are all disposed in a housing 240, which includes a connector 244.

Specifically, regarding the vehicle radar device 200 of the 2nd embodiment, except the configurations of the first transmitting elements 261, the first receiving elements 271, the second narrow-angle transmitting elements 260, the second wide-angle transmitting elements 266, the second narrow-angle receiving elements 270 and the second wide-angle receiving elements 277 being different from the configurations recited in the aforementioned 1st embodiment, the other characteristics of the vehicle radar device 200 may be the same as the corresponding characteristics of the vehicle radar device 100.

In the 2nd embodiment, each of the first transmitting elements 261 is a rectangular microstrip slot antenna and has a dimension about 3.2 mm (length)×0.5 mm (width). A number of the first transmitting elements 261 is sixteen, and the first transmitting elements 261 are arranged as an array of 2×8. Based on demands, one of the first transmitting elements 261 may be communicatively connected to another thereof by at least one of a series connection and a parallel connection, and the first transmitting elements 261 have at least one feeding port. Each of the first receiving elements 271 is a rectangular microstrip slot antenna and has a dimension about 3.2 mm (length)×0.5 mm (width). A number of the first receiving elements 271 is sixteen, and the first receiving elements 271 are arranged as an array of 2x8. Based on demands, one of the first receiving elements 271 may be communicatively connected to another thereof by at least one of a series connection and a parallel connection, and the first receiving elements 271 have at least one feeding port. Each of the second narrow-angle transmitting elements 260 is a rectangular microstrip slot antenna and has a dimension about 3.2 mm (length)×0.5 mm (width). A number of the second narrow-angle transmitting elements 260 is sixteen, and the second narrow-angle transmitting elements 260 are arranged as an array of 4×4. Based on demands, one of the second narrow-angle transmitting elements 260 may be communicatively connected to another thereof by at least one of a series connection and a parallel connection, and the second narrow-angle transmitting elements 260 have at least one feeding port. Each of the second wide-angle transmitting elements 266 is a rectangular microstrip slot antenna and has a dimension about 3.2 mm (length)×0.5 mm (width). A number of the second wide-angle transmitting elements 266 is sixteen, and the second wide-angle transmitting elements 266 are arranged as an array of 4×4. Based on demands, one of the second wide-angle transmitting elements 266 may be communicatively connected to another thereof by at least one of a series connection and a parallel connection, and the second wide-angle transmitting elements 266 have at least one feeding port. Each of the second narrow-angle receiving elements 270 is a rectangular microstrip slot antenna and has a dimension about 3.2 mm (length)×0.5 mm (width). A number of the second narrow-angle receiving elements 270 is sixteen, and the second narrow-angle receiving elements 270 are arranged as an array of 4×4. Based on demands, one of the second narrow-angle receiving elements 270 may be communicatively connected to another thereof by at least one of a series connection and a parallel connection, and the second narrow-angle receiving elements 270 have at least one feeding port. Each of the second wide-angle receiving elements 277 is a rectangular microstrip slot antenna and has a dimension about 3.2 mm (length)×0.5 mm (width). A number of the second wide-angle receiving elements 277 is sixteen, and the second wide-angle receiving elements 277 are arranged as an array of 4x4. Based on demands, one of the second wide-angle receiving elements 277 may be communicatively connected to another thereof by at least one of a series connection and a parallel connection, and the second wide-angle receiving elements 277 have at least one feeding port. Furthermore, the series connections, the parallel connections and the feeding ports recited in this paragraph can be configured according to demands and thereby are not specifically shown in the drawings.

Figure 3:
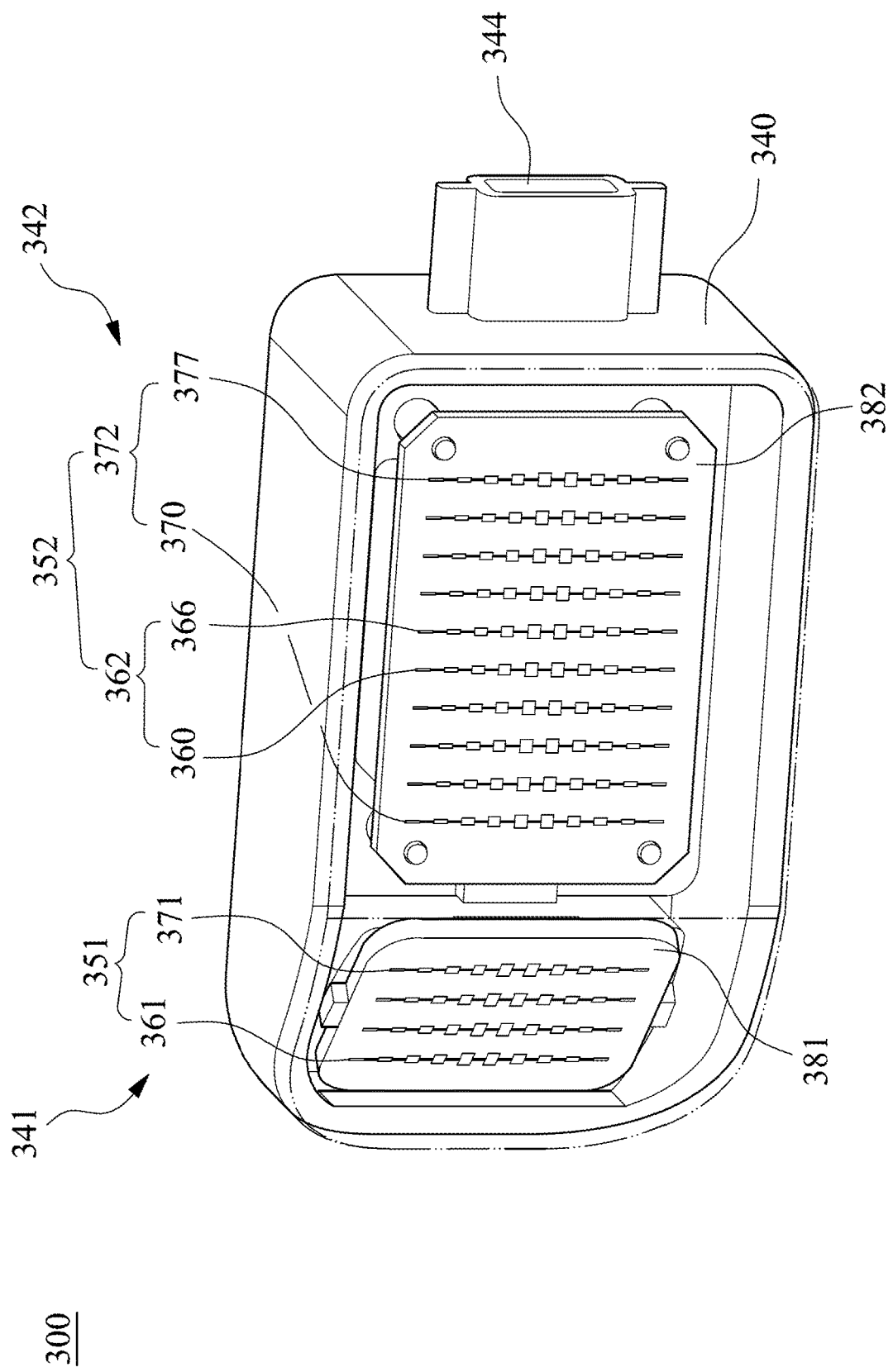
FIG. 3 is a schematic view of a vehicle radar device according to the 3rd embodiment of the present disclosure.

FIG. 3 is a schematic view of a vehicle radar device 300 according to the 3rd embodiment of the present disclosure. In FIG. 3, the vehicle radar device 300 includes a radar control unit (not shown in drawings), a first antenna array 351, a second antenna array 352, a first circuit board 381 and a second circuit board 382. The first antenna array 351 is communicatively connected to the radar control unit. The first antenna array 351 includes a plurality of first transmitting elements 361 and a plurality of first receiving elements 371. The first antenna array 351 is a plurality of circuit board antennas and disposed on the first circuit board 381. The second antenna array 352 is communicatively connected to the radar control unit. The second antenna array 352 includes a plurality of second transmitting elements 362 and a plurality of second receiving elements 372. The second transmitting elements 362 are a plurality of second narrow-angle transmitting elements 360 and a plurality of second wide-angle transmitting elements 366. The second receiving elements 372 are a plurality of second narrow-angle receiving elements 370 and a plurality of second wide-angle receiving elements 377. The second antenna array 352 is a plurality of circuit board antennas and disposed on the second circuit board 382. An angle P12 between the first circuit board 381 and the second circuit board 382 is 135 degrees. In addition, the first circuit board 381, the second circuit board 382 and the third circuit board (not shown in drawings) are all disposed in a housing 340, which includes a connector 344.

Specifically, each of the first transmitting elements 361, the first receiving elements 371, the second narrow-angle transmitting elements 360, the second wide-angle transmitting elements 366, the second narrow-angle receiving elements 370 and the second wide-angle receiving elements 377 is a series-fed patch array (SFPA), and a configuration and at least one feeding port thereof can be configured according to demands and are not more specifically shown in the drawings. Furthermore, regarding the vehicle radar device 300 of the 3rd embodiment, except the antenna type of the first antenna array 351, the antenna type of the second antenna array 352, the dimension of the first circuit board 381 and the dimension of the second circuit board 382 being different from those recited in the aforementioned 1st embodiment, the other characteristics of the vehicle radar device 300 may be the same as the corresponding characteristics of the vehicle radar device 100.

Figure 4A:
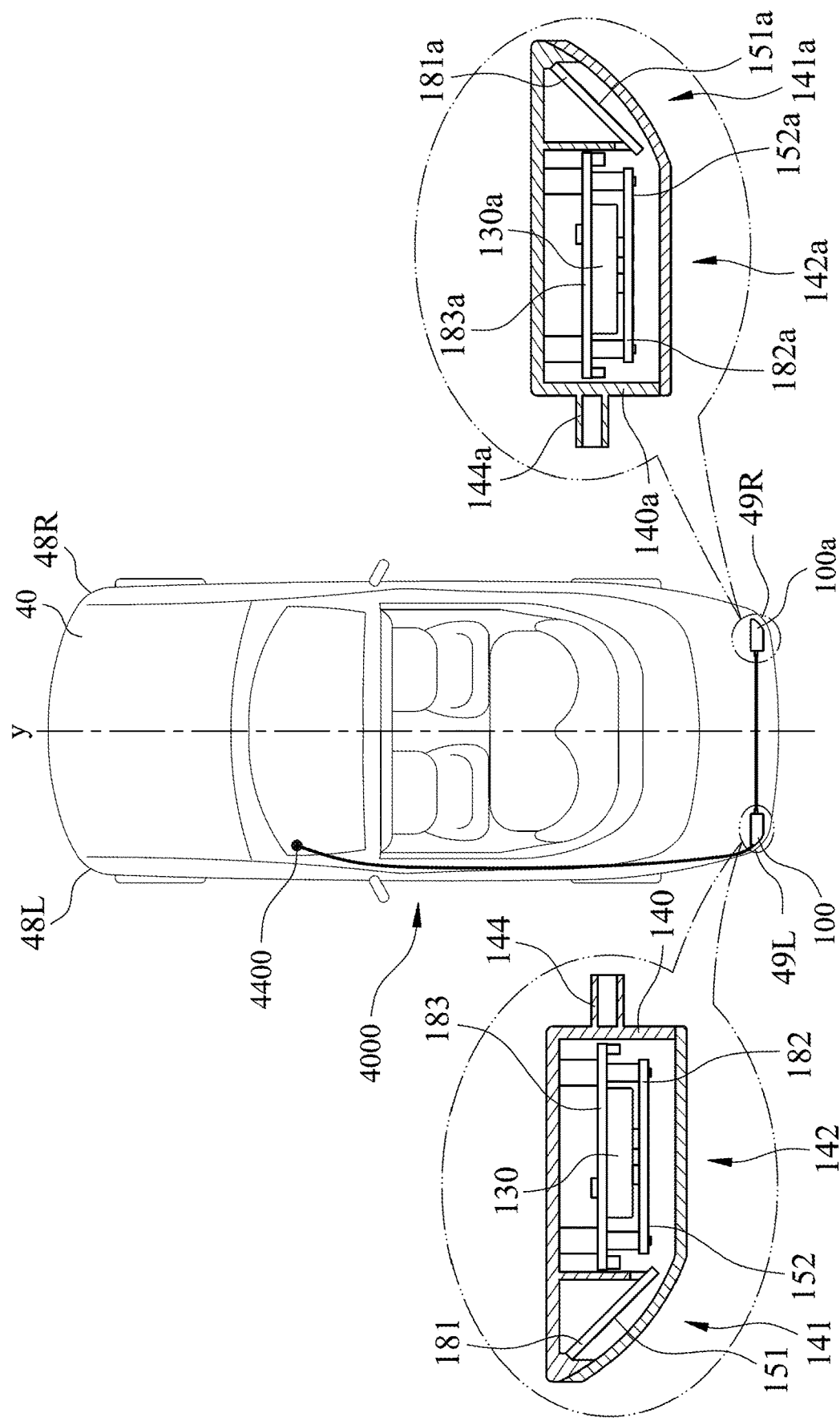
FIG. 4A is a schematic view of a vehicle radar system according to the 4th embodiment of the present disclosure, disposed in a vehicle.
Figure 4B:
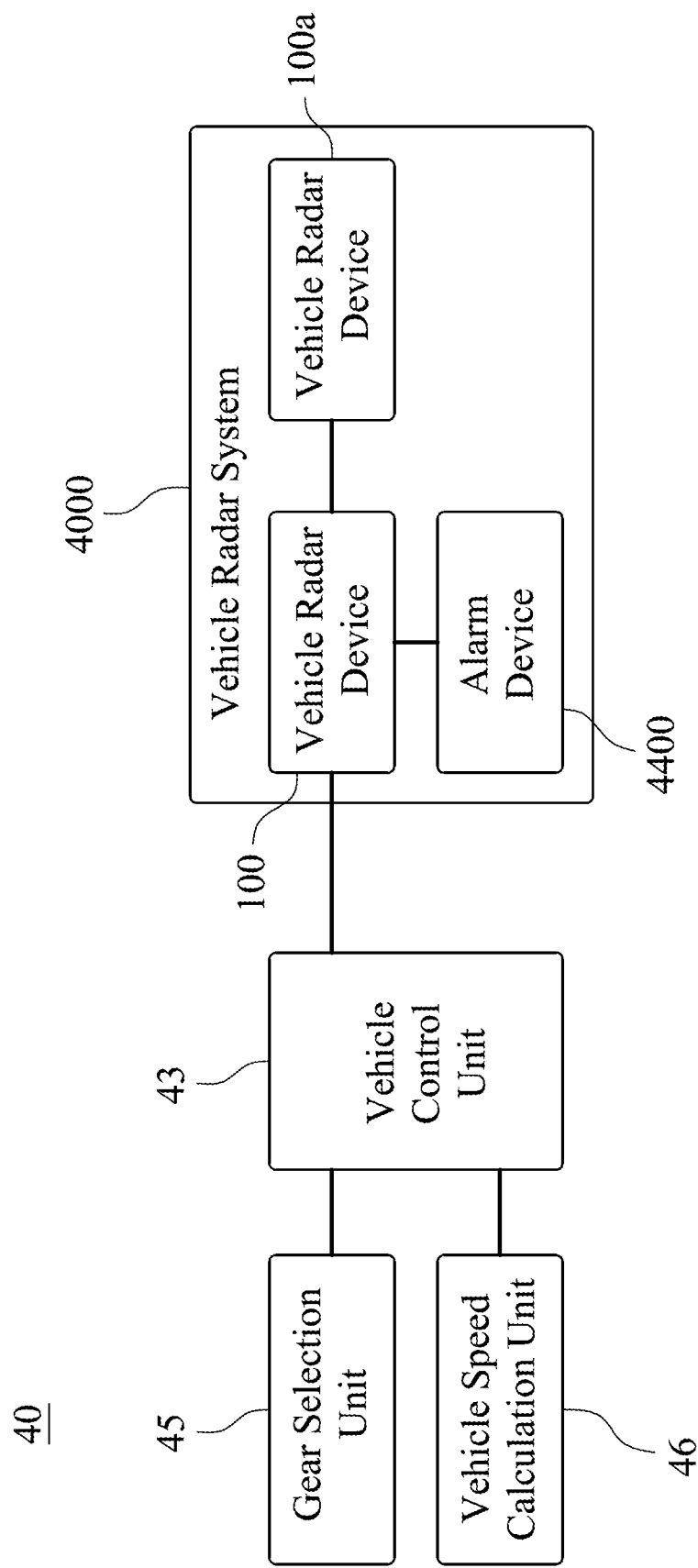
FIG. 4B is a block diagram of the vehicle radar system according to the 4th embodiment disposed in the vehicle.
Figure 4C:
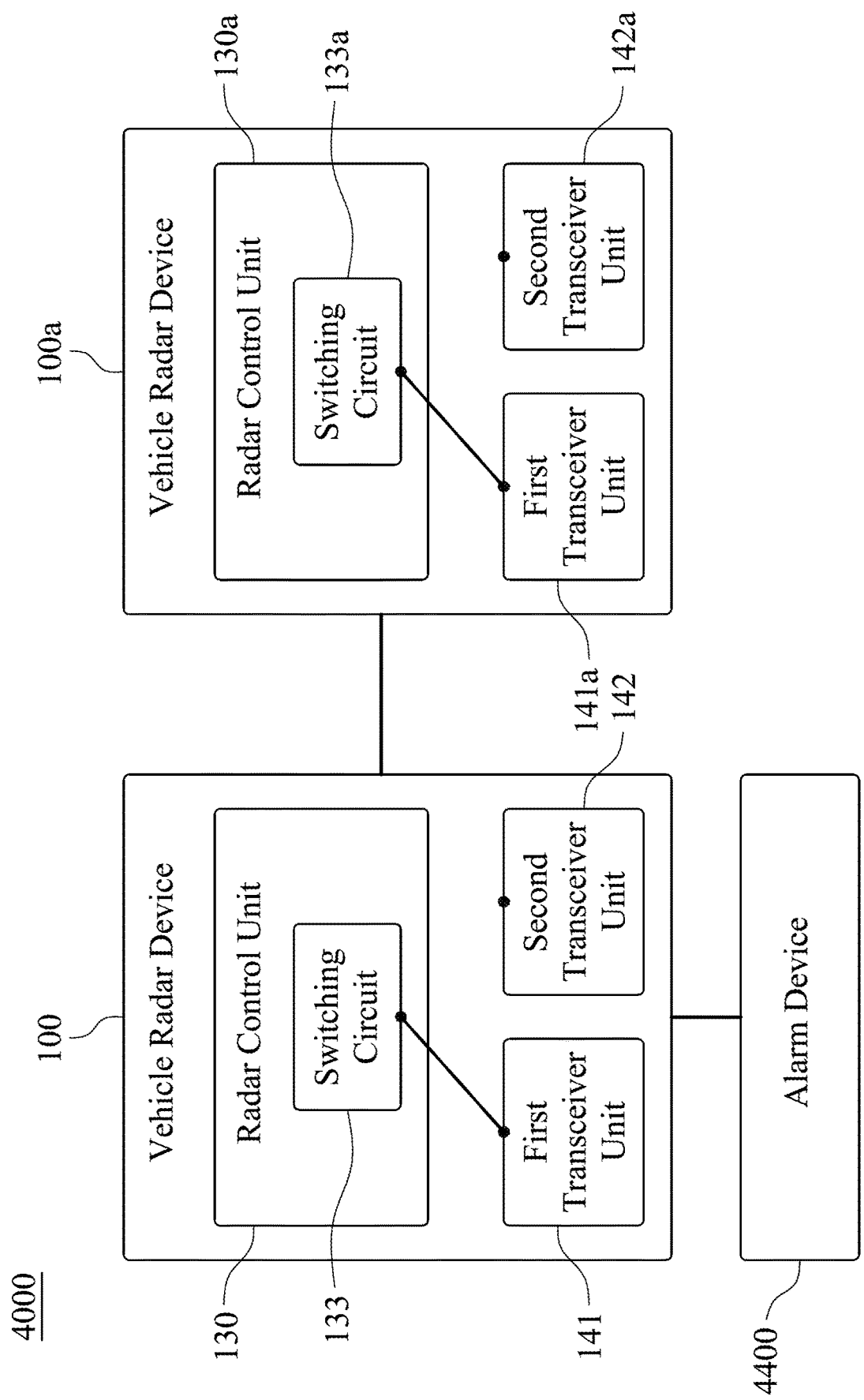
FIG. 4C is a block diagram of the vehicle radar system according to the 4th embodiment.

FIG. 4A is a schematic view of a vehicle radar system 4000 according to the 4th embodiment of the present disclosure, which is disposed in a vehicle 40. FIG. 4B is a block diagram of the vehicle radar system 4000 according to the 4th embodiment disposed in the vehicle 40. FIG. 4C is a block diagram of the vehicle radar system 4000 according to the 4th embodiment. In FIG. 1A and FIG. 4A to FIG. 4C, the vehicle radar system 4000 is disposed in the vehicle 40 and includes the vehicle radar device 100 recited in the aforementioned 1st embodiment. The vehicle radar device 100 includes the radar control unit 130, a first transceiver unit 141 and a second transceiver unit 142. The first transceiver unit 141 is communicatively connected to the radar control unit 130 and includes the first antenna array 151, and thereby the first antenna array 151 is also communicatively connected to the radar control unit 130. The second transceiver unit 142 is communicatively connected to the radar control unit 130 and includes the second antenna array 152, and thereby the second antenna array 152 is also communicatively connected to the radar control unit 130. In addition, it shall be realized that other vehicle radar device according to the present disclosure can be included in the vehicle radar system 4000.

Figure 4D:
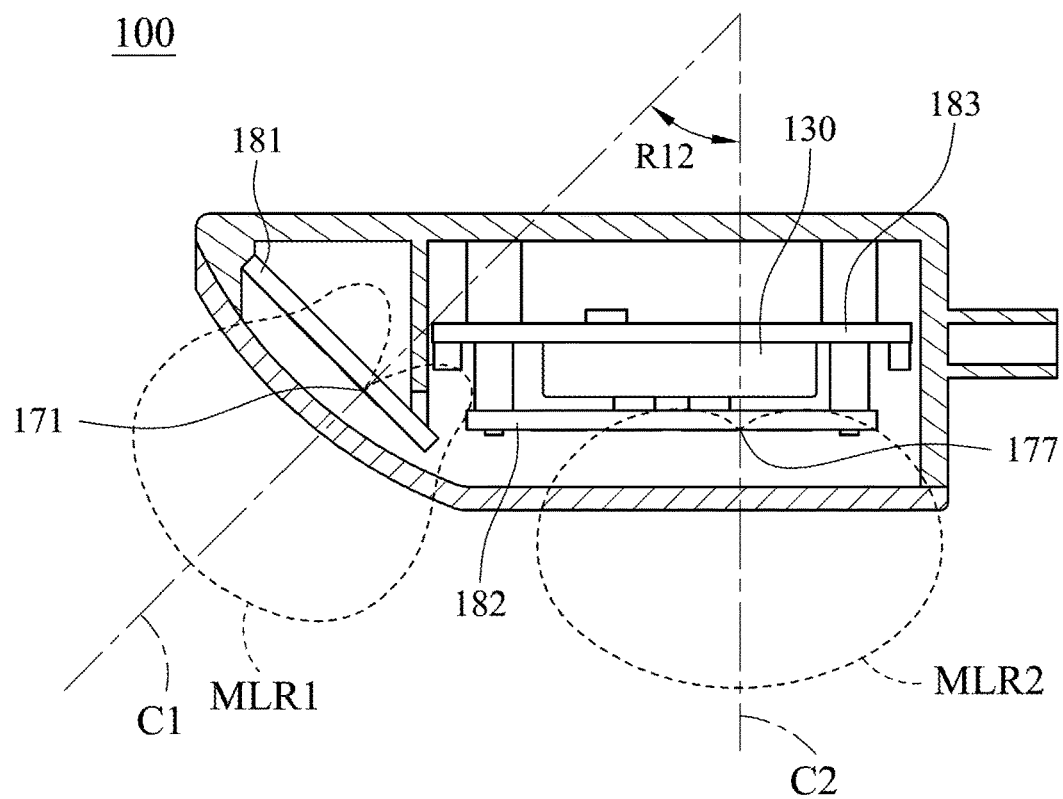
FIG. 4D is a schematic view of the parameter R12 according to the 4th embodiment.
Figure 4E:
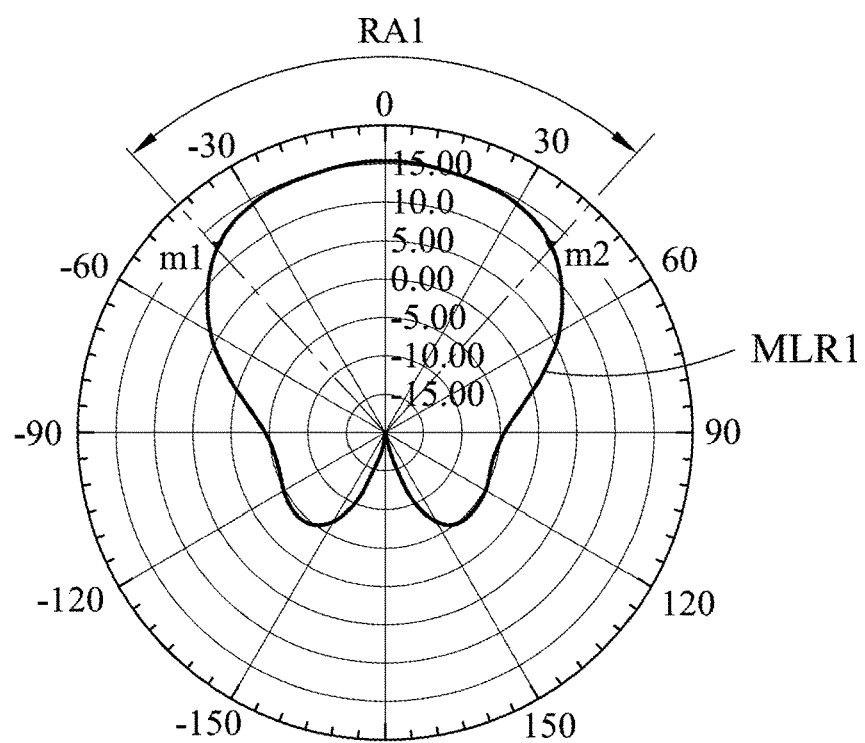
FIG. 4E is a schematic view of a radiation pattern of first receiving elements according to the 4th embodiment.
Figure 4F:
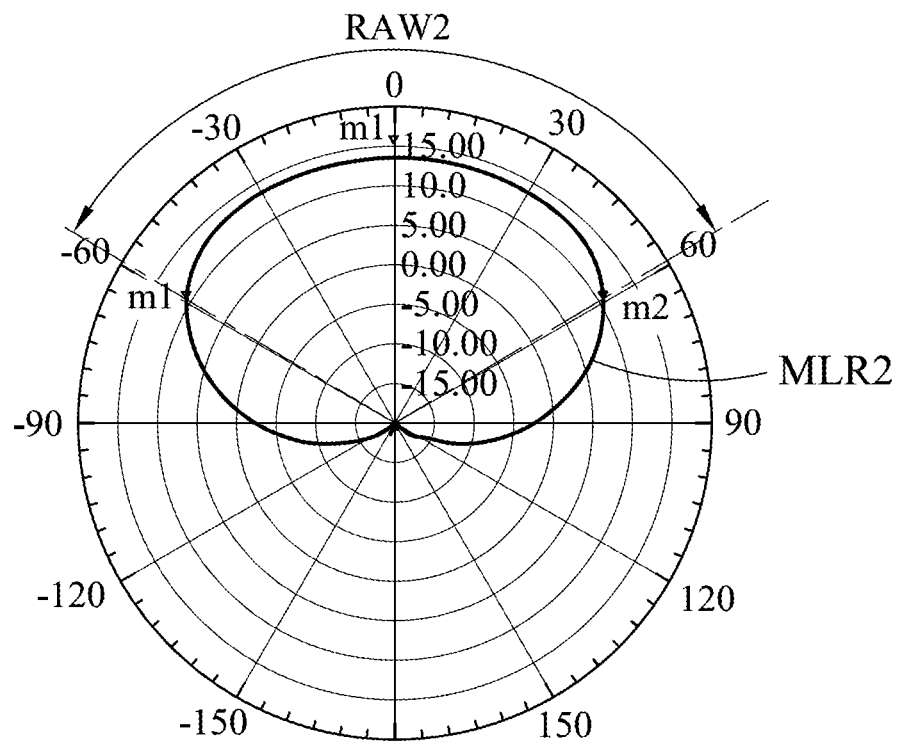
FIG. 4F is a schematic view of a radiation pattern of second receiving elements according to the 4th embodiment.

FIG. 4D is a schematic view of a parameter R12 according to the 4th embodiment. FIG. 4E is a schematic view of a radiation pattern on a horizontal plane (orientated the same as a horizontal direction of the vehicle 40) of the first receiving elements 171 according to the 4th embodiment. FIG. 4F is a schematic view of a radiation pattern on a horizontal plane of the second receiving elements 172 (specifically the second wide-angle receiving elements 177 thereof) according to the 4th embodiment. Specifically, a schematic view of a parameter T12 is similar to FIG. 4D. In FIG. 4D to FIG. 4F, the first antenna array 151 may include the first transmitting elements 161 and the first receiving elements 171. The second antenna array 152 may include the second transmitting elements 162 and the second receiving elements 172. When an angle between a centerline of a horizontal main lobe (i.e. a main lobe on the horizontal plane) of the first transmitting elements 161 and a centerline of a horizontal main lobe of the second transmitting elements 162 is T12, and an angle between a centerline C1 of a horizontal main lobe MLR1 of the first receiving elements 171 and a centerline C2 of a horizontal main lobe MLR2 of the second receiving elements 172 is R12, the following conditions may be satisfied: 0 degrees<T12≤90 degrees; and 0 degrees<R12≤90 degrees. Accordingly, the vehicle radar system 4000 is advantageous in simultaneously providing detections in different directions and maintaining the individual detection accuracy by the first antenna array 151 and the second antenna array 152. Furthermore, the following condition may be satisfied: 15 degrees≤R12≤75 degrees. Moreover, the following condition may be satisfied: 30 degrees≤R12≤60 degrees. In the 1st embodiment, the parameter T12 is 45 degrees, and the parameter R12 is 45 degrees.

Furthermore, in FIG. 1C and FIG. 4A, the vehicle radar device 100 may be disposed at one of four corners (i.e. a left-front corner 48L, a right-front corner 48R, a left-rear corner 49L and a right-rear corner 49R shown in FIG. 4A) of the vehicle 40. Specifically, the vehicle radar device 100 is disposed at the left-rear corner 49L as shown in FIG. 4A. The vehicle radar device 100 may further include the first circuit board 181 and the second circuit board 182. The first circuit board 181 is vertical to the horizontal direction of the vehicle 40. The first antenna array 151 is the circuit board antennas and disposed on the first circuit board 181. The second circuit board 182 is vertical to the horizontal direction of the vehicle 40. The second antenna array 152 is the circuit board antennas and disposed on the second circuit board 182. When the angle between the first circuit board 181 and the second circuit board 182 is P12, the following condition may be satisfied: 60 degrees≤P12≤180 degrees. Accordingly, the first antenna array 151 and the second antenna array 152 are advantageous in respectively providing detections in accordance with various application requirements, reducing the cost of the vehicle radar system 4000 and simplifying the detection optimizing procedure. Furthermore, the following condition may be satisfied: 90 degrees≤P12≤180 degrees. Moreover, the following condition may be satisfied: 105 degrees≤P12≤165 degrees. In addition, the following condition may be satisfied: 120 degrees≤P12≤150 degrees.

In FIG. 4E, when a half power beam width (HPBW) of the horizontal main lobe MLR1 of the first receiving elements 171 is RA1, which is defined by half power markers m1 and m2, the following condition may be satisfied: 75 degrees≤RA1≤180 degrees. In the 4th embodiment, a value of the parameter RA1 is 84 degrees. Therefore, a wider detection range can be provided by the first antenna array 151.

In FIG. 4F, a half power beam width of the horizontal main lobe MLR2 of the second wide-angle receiving elements 177 of the second receiving elements 172 is RAW2, which is defined by half power markers m1 and m2. In the 4th embodiment, a value of the parameter RAW2 is 118 degrees.

The vehicle radar device 100 may further include the third circuit board 183. The radar control unit 130 is disposed on the third circuit board 183. Only one of the first circuit board 181 and the second circuit board 182 (specifically only the second circuit board 182 in the 4th embodiment) is parallel to the third circuit board 183. Accordingly, it is beneficial to the vehicle radar system 4000 to achieve a compact size. In an embodiment according to the present disclosure (not shown in drawings), it may be only the first circuit board of the first circuit board and the second circuit board parallel to the third circuit board.

Specifically, besides including the first transmitting elements 161, a transmitting circuit of the first transceiver unit 141 may further include other elements (not shown in drawings), such as a local oscillator, a phase locked loop (PLL), a power amplifier and etc., which may be disposed on the first circuit board 181 or the third circuit board 183. The local oscillator supporting a wider bandwidth is advantageous in increasing the distance resolution, due to the distance resolution of the vehicle radar system 4000 is determined by the signal bandwidth generated by the transmitting circuit. Furthermore, the phase locked loop is beneficial to the phase control of the local oscillator so as to minimize the phase noise of the local oscillator. Besides including the first receiving elements 171, a receiving circuit of the first transceiver unit 141 may further include other elements (not shown in drawings), such as a low noise amplifier, an image rejection and clutter cancellation circuit portion and etc., which may be disposed on the first circuit board 181 or the third circuit board 183. Configurations of a transmitting circuit and a receiving circuit of the second transceiver unit 142 may be different from but similar to those of the first transceiver unit 141, and the elements of the second transceiver unit 142 may be disposed on the second circuit board 182 or the third circuit board 183. Alternately, a transmitting circuit and a receiving circuit (except the first antenna array 151 and second antenna array 152 thereof, respectively) may be both switched to be used by the first transceiver unit 141 or the second transceiver unit 142.

In addition, the first transceiver unit 141 and the second transceiver unit 142 are configured to generate FMCW (Frequency Modulated Continuous Wave) triangular waveform signals. After the first transceiver unit 141 and the second transceiver unit 142 receive a plurality of echo signals, the radar control unit 130 performs a FFT (Fast Fourier Transform) step to obtain a beat frequency and a Doppler shift data of a target object (or a target vehicle), and then estimates a distance, a speed and an angle information of the target object with respect to the vehicle radar device 100 according to the data. An algorithm configured in the radar control unit 130 includes the FFT, a beamforming and a CFAR (Constant False Alarm Rate) steps, wherein the FFT step is configured to provide the distance and the speed information, the beamforming step is configured to estimate the angle and a position information, and the CFAR step is configured to detect the target object while the clutter and other noise existing.

In FIG. 1B and FIG. 4A, the operating frequency of the first antenna array 151 and the operating frequency of the second antenna array 152 may be both greater than 10 GHz. Each of the first transmitting elements 161, each of the first receiving elements 171, each of the second transmitting elements 162 and each of the second receiving elements 172 is the microstrip antenna extending along the horizontal direction of the vehicle 40 and has the length smaller than 40 mm. Therefore, it is advantageous in reducing the number of the vehicle radar device 100 equipped in the vehicle radar system 4000 and maintaining the same applications and functions.

In an embodiment according to the present disclosure, the first transmitting elements, the first receiving elements, the second transmitting elements and the second receiving elements may be circuit board antennas, which may be microstrip antennas specifically, e.g. slots antenna, patch antennas, microstrip shape antennas or comb antennas extending along a horizontal direction or a vertical direction of a vehicle. Alternately, the first transmitting elements, the first receiving elements, the second transmitting elements and the second receiving elements may not be circuit board antennas, e.g. dish antennas. Moreover, types of the first transmitting elements, the first receiving elements, the second transmitting elements and the second receiving elements are not limited thereto, and the following conditions are satisfied: 0 degrees<T12≤90 degrees; and 0 degrees<R12≤90 degrees.

In FIG. 4A, the vehicle radar system 4000 includes two vehicle radar devices, i.e. vehicle radar devices 100 and 100a, which are respectively disposed at the left-rear corner 49L and the right-rear corner 49R of the vehicle 40, and located inside the bumper fascia. The first circuit board 181 included in the vehicle radar device 100 and a first circuit board 181a included in the vehicle radar device 100a face a left direction and a right direction of the vehicle 40, respectively, and are disposed symmetrically relative to a longitudinal centerline y of the vehicle 40. That is, first transceiver units 141 and 141a, which are included in the vehicle radar devices 100 and 100a, respectively, are configured to respectively detect a left environment and a right environment of the vehicle 40, and also both detect a rear environment of the vehicle 40. The second circuit board 182 included in the vehicle radar device 100 and a second circuit board 182a included in the vehicle radar device 100a both face a rear direction of the vehicle 40 and are disposed symmetrically relative to the longitudinal centerline y of the vehicle 40. That is, second transceiver units 142 and 142a, which are included in the vehicle radar devices 100 and 100a, respectively, are both configured to detect the rear environment of the vehicle 40. Accordingly, the vehicle radar system 4000 can provide the detection information of the left direction, the right direction and the rear direction of the vehicle 40 so as to achieve the functions of BSD (Blind Spot Detection), LCA (Lane Change Assistance) and reverse detection of the vehicle 40 via a single device set (i.e. the vehicle radar devices 100 and 100a).

Specifically, the vehicle radar device 100a disposed at the right-rear corner 49R of the vehicle 40 includes the radar control unit 130a, the first transceiver unit 141a, the second transceiver unit 142a, the first circuit board 181a, the second circuit board 182a and the third circuit board 183a. The first transceiver unit 141a is communicatively connected to the radar control unit 130a and includes a first antenna array 151a. The second transceiver unit 142a is communicatively connected to the radar control unit 130a and includes a second antenna array 152a. The first circuit board 181a is vertical to the horizontal direction of the vehicle 40. The first antenna array 151a is a plurality of circuit board antennas and disposed on the first circuit board 181a. The second circuit board 182a is vertical to the horizontal direction of the vehicle 40. The second antenna array 152a is a plurality of circuit board antennas and disposed on the second circuit board 182a. The radar control unit 130a is disposed on the third circuit board 183a. Only the second circuit board 182a of the first circuit board 181a and the second circuit board 182a is parallel to the third circuit board 183a. In addition, the first circuit board 181a, the second circuit board 182a and the third circuit board 183a are all disposed in a housing 140a, which includes a connector 144a. In brief, the vehicle radar device 100a may be featured the same as those of the vehicle radar device 100, which are recited in the aforementioned 1st and 4th embodiments. The vehicle radar devices 100 and 100a may be different devices, and the physical structures respectively of the vehicle radar devices 100 and 100a are symmetrically relative to the longitudinal centerline y of the vehicle 40. Alternately, the vehicle radar devices 100 and 100a may be the same devices, and the physical structures respectively of the vehicle radar devices 100 and 100a are symmetrically relative to the longitudinal centerline y of the vehicle 40.

In FIG. 4B, the vehicle radar device 100a may be communicatively connected to a vehicle control unit 43 of the vehicle 40 via the vehicle radar device 100. Accordingly, the control and the interface design of the vehicle radar system 4000 being simplified are beneficial to be integrated with the vehicle control unit 43 and equipped in the vehicle 40. Regarding the vehicle radar system 4000 in the 4th embodiment, the vehicle radar device 100 acts as a master radar, the vehicle radar device 100a acts as a slave radar, and the vehicle radar device 100a is communicatively connected to the vehicle control unit 43 of the vehicle 40 via the vehicle radar device 100. The vehicle radar device 100 and the vehicle control unit 43 may be communicatively connected by CAN (Controller Area Network), and the vehicle radar device 100 and 100a may be communicatively connected by CAN. In addition, the vehicle radar system 4000 may further include an alarm device 4400 communicatively connected to the vehicle radar device 100 by a wired manner or a wireless manner. The alarm device 4400 is configured to generate alarm signals to remind a driver of the vehicle 40 when the vehicle 40 satisfies emergency conditions. The alarm device 4400 may be a speaker, a buzzer, a display, or a light indicator to remind the driver by a sound or light manner, but not limited thereto.

In FIG. 4B and FIG. 4C, the radar control units 130 and 130a respectively include switching circuits 133 and 133a configured to switch the first transceivers units 141, 141a or the second transceiver units 142, 142a to be in a detection mode. Only the first transceiver units 141, 141a are in the detection mode when the vehicle 40 is in a forward state (e.g. D gear of a gear selection unit 45 being selected), so that the detection information of the left direction, the right direction and the rear direction of the vehicle 40 can be provided to achieve the BSD and LCA functions of the vehicle 40. Only the second transceiver units 142, 142a are in the detection mode when the vehicle 40 is in a reverse state (e.g. R gear of the gear selection unit 45 being selected), so that the detection information of the rear direction of the vehicle 40 can be provided to achieve the reversing detection function of the vehicle 40. Therefore, the vehicle 40 is advantageous in switching the first transceivers units 141, 141*a* or the second transceiver units 142, 142*a* to be in the detection mode according to the forward state or the reverse state thereof.

Figure 4G:
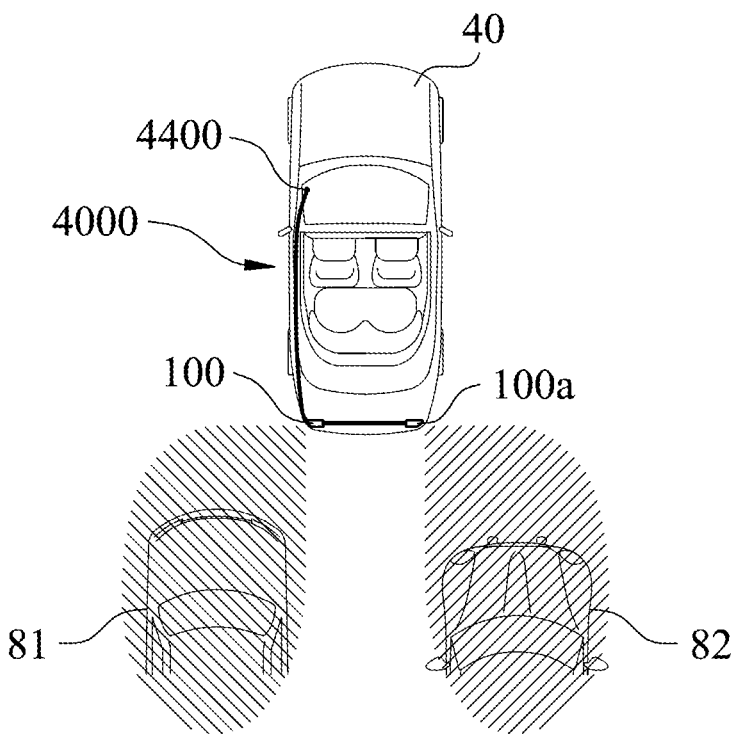
FIG. 4G is a schematic view of the first transceiver units in a detection mode according to the 4th embodiment.

FIG. 4G is a schematic view of the first transceiver units 141 and 141*a* in the detection mode according to the 4th embodiment. In FIG. 4A and FIG. 4G, the first transceiver units 141 and 141*a* both have angles of arrival (AOA) above 30 degrees and detection distances between 50 m and 70 m. When the vehicle radar devices 100 and 100*a* are applied to the BSD function of the vehicle 40, based on a relative position and a relative speed of a moving object (or the target vehicle) with respect to the vehicle 40, it would be determined if the moving object is within a blind zone of the vehicle 40, and the driver would be timely reminded the risks associated with changing lanes and other movements. When the vehicle radar devices 100 and 100*a* are applied to the LCA function of the vehicle 40, the vehicle radar devices 100 and 100*a* are configured to compute the movement information of the moving objects in the left, right and rear directions and obtain the current state (e.g. the forward state or the reverse state) of the vehicle 40, and then the alarm device 4400 would remind the driver to aid to determine the lane change timing to prevent from the traffic accident caused by the lane change.

In detail, when the vehicle radar devices 100 and 100*a* are applied to the BSD and LCA functions of the vehicle 40, the operation frequency thereof is about 77 GHz or 79 GHz, and a voltage range thereof is 9 V to 16 V. The BSD mode can be triggered or activated to enable the first transceiver units 141 and 141*a* when the vehicle 40 is in the forward state, or the BSD mode can be activated while the vehicle 40 being in the forward state and a vehicle speed being greater than 10 kph calculated by a vehicle speed calculation unit 46. When the vehicle radar devices 100 and 100*a* are applied to the LCA function of the vehicle 40, the LCA mode can be activated while the BSD mode being activated and the vehicle speed being greater than 20 kph. The BSD mode can be terminated and followed by the LCA mode being terminated, while the vehicle 40 being in the reverse mode or the vehicle speed being smaller than 10 kph. Therefore, the vehicle radar system 4000 are advantageous in detecting multiple target vehicles (e.g. target vehicles 81 and 82) to analyze the distance and speed information with respect to the vehicle 40 so as to obtain information of TTC (Time-to-Collision) between each target vehicle and the vehicle 40. One target vehicle closest to the vehicle 40 among the target vehicles, which reach a TTC threshold (Le. one of first emergency conditions), acts as an alarm target, and then the alarm device 4400 generates the alarm signal to remind the driver.

In addition, when the vehicle radar devices 100 and 100*a* are applied to the LCA function of the vehicle 40, an alarm threshold (another of the first emergency conditions, which causes the alarm device 4400 to generate the alarm signal) of a rear side of the vehicle 40 being approached by the target vehicle is TTC 5 seconds, and a distance range of 35 m to 10 m between the target vehicle and the rear side of the vehicle 40 or a distance range of 0.5 m to 5 m between the target vehicle and a left side or a right side of the vehicle 40. The conditions of the alarm device 4400 stopping the alarm signal are a distance range of 10 m to 25 m between the target vehicle and the left side or the right side of the vehicle 40 and the vehicle 40 being approached by the target vehicle with TTC>2 seconds, or a distance being greater than 20 m between the target vehicle and the rear side of the vehicle 40, or a distance being greater than 3 m between the target vehicle and the left side or the right side of the vehicle 40. The LCA mode is terminated while the vehicle 40 being in the reverse mode or the vehicle speed being smaller than 20 kph. The LCA mode being terminated follows the BSD mode being terminated.

Figure 4H:
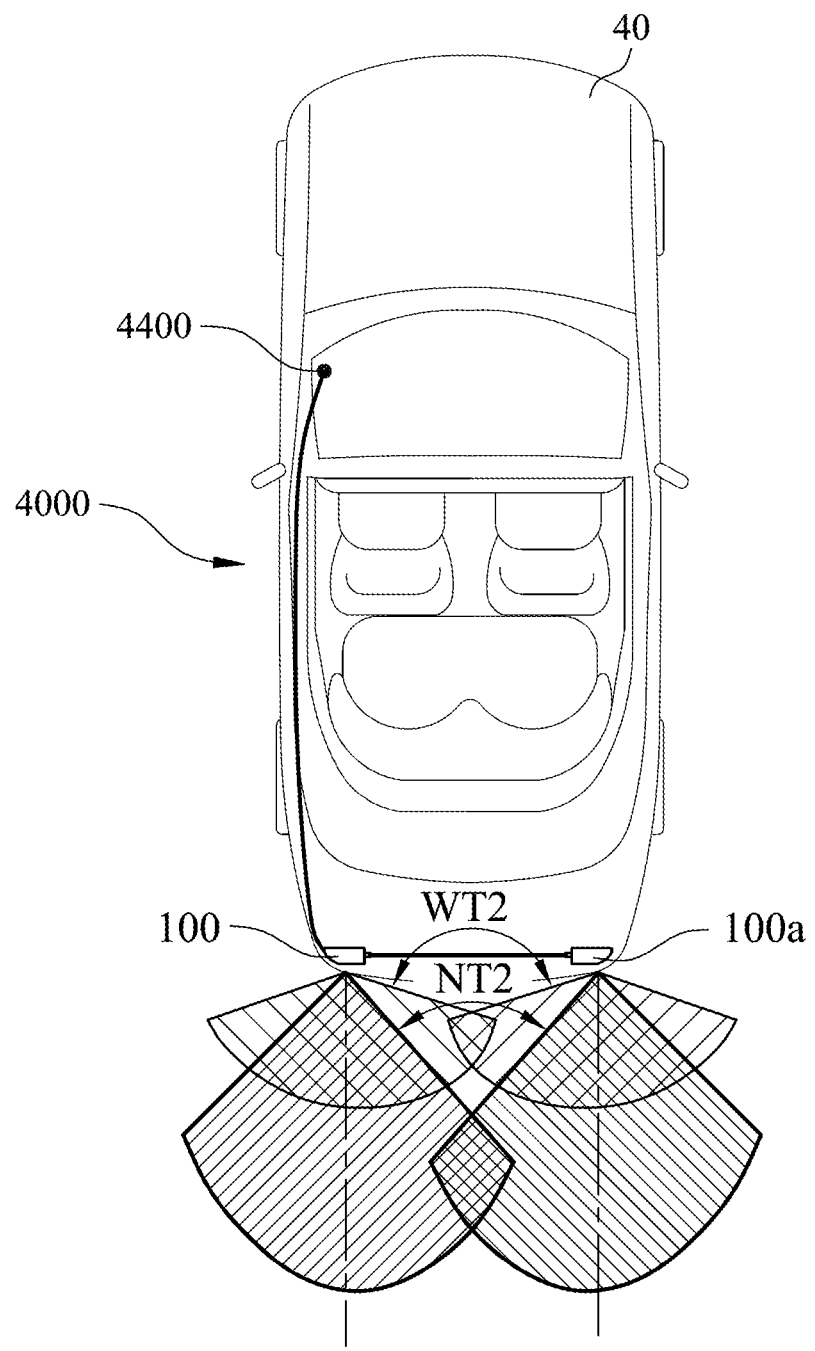
FIG. 4H is a schematic view of the parameters NT2 and WT2 according to the 4th embodiment."

FIG. 4H is a schematic view of the parameters NT2 and WT2 according to the 4th embodiment. In FIG. 1A, FIG. 4A and FIG. 4H, the second transmitting elements 162 of the vehicle radar device 100 may be the second narrow-angle transmitting elements 160 and the second wide-angle transmitting elements 166, and the radar control unit 130 is for switching the second narrow-angle transmitting elements 160 or the second wide-angle transmitting elements 166 to operate. The second receiving elements 172 of the vehicle radar device 100 may be the second narrow-angle receiving elements 170 and the second wide-angle receiving elements 177, and the radar control unit 130 is for switching the second narrow-angle receiving elements 170 or the second wide-angle receiving elements 177 to operate. The second transmitting elements of the vehicle radar device 100*a* may be a plurality of second narrow-angle transmitting elements and a plurality of second wide-angle transmitting elements (not shown in drawings), and the radar control unit 130*a* is for switching the second narrow-angle transmitting elements or the second wide-angle transmitting elements to operate. The second receiving elements of the vehicle radar device 100*a* may be a plurality of second narrow-angle receiving elements and a plurality of second wide-angle receiving elements (not shown in drawings), and the radar control unit 130*a* is for switching the second narrow-angle receiving elements or the second wide-angle receiving elements to operate.

When the second transceiver units 142 and 142*a* are in the detection mode, an angle of a central blind zone (its reference numeral is omitted) defined by the radiation pattern of the second narrow-angle receiving element 170 disposed at the left-rear corner 49L and the radiation pattern of the second narrow-angle receiving element disposed at the right-rear corner 49R is NT2, that is, the central blind zone is formed between angles of arrival of horizontal plans of the aforementioned second narrow-angle receiving elements. The parameter NT2 is as showing in FIG. 4H and has a value about 80 degrees. An angle of a central blind zone (its reference numeral is omitted) defined by the radiation pattern of the second wide-angle receiving element 177 disposed at the left-rear corner 49L and the radiation pattern of the second wide-angle receiving element disposed at the right-rear corner 49R is WT2, That is, the central blind zone is formed between angles of arrival of horizontal plans of the aforementioned second wide-angle receiving elements. The parameter WT2 is as showing in FIG. 4H and has a value about 140 degrees. Thus, the vehicle radar system 4000 of the 4th embodiment may satisfy the following conditions: 15 degrees≤NT2≤120 degrees; and 60 degrees≤WT2≤175 degrees. Therefore, the radar control units 130 and 130*a* would switch from the second narrow-angle transmitting/receiving elements (middle and short range antennas) to the second wide-angle transmitting/receiving elements (short range antennas) along with an obstruct approaching the rear side of the vehicle 40 so as to accurately detect the obstruct behind the vehicle 40. Furthermore, signals generated by the second antenna arrays 152 and 152*a* form an intersection network. The central blind zone is formed out of the intersection network. When the angles of the central blind zones are larger, the detection coverages are larger.

Moreover, the conventional ultrasonic radar usually has smaller detection angle, and thereby multiple conventional ultrasonic radars are required (four radars required generally) to be equipped to coverage the rear area of the vehicle. The vehicle radar devices 100 and 100a according to the present disclosure are millimeter wave radars, it is beneficial to apparently improve the detection problems resulted from blind zone and adjust the detection angles via the design of the second antenna arrays 152 and 152a (or the second circuit boards 182 and 182a). Thus, the vehicle radar devices 100 and 100a respectively disposed at the left-rear corner 49L and the right-rear corner 49R can coverage the rear detection of the vehicle 40 so as to prevent the bumper from being punched and reduce time and manpower during installing.

A transmitting signal of the second transceiver units 142 and 142a may be generated with at least one of a time division multiplexing manner, a frequency division multiplexing manner and an orthogonal signal manner controlled by the radar control units 130 and 130a. Therefore, the second transceiver units 142 and 142a can be effectively prevented from detection interference caused by a rear overlapping zone of the vehicle 40.

When the vehicle radar devices 100 and 100a are applied to the reversing detection function of the vehicle 40, the operation frequency thereof is about 77 GHz or 79 GHz, and a voltage range thereof is 9 V to 16 V. The reversing detection mode can be triggered or activated to enable the second transceiver units 142 and 142a when the vehicle 40 is in the reverse state, or the reversing detection mode can be activated while the vehicle 40 being in the reverse state and the vehicle speed being smaller than 8 kph calculated by the vehicle speed calculation unit 46. When second emergency condition related to the distance, the vehicle speed or TTC is satisfied, the alarm device 4400 generates an alarm signal. The radar control units 130 and 130a would switch from the second narrow-angle transmitting/receiving elements (middle and short range antennas, long detection distance, and long alarm distance) to the second wide-angle transmitting/receiving elements (short range antennas, short detection distance, and short alarm distance) along with an obstruct approaching the rear side of the vehicle 40 so as to accurately detect the obstruct behind the vehicle 40.

Figure 5A:
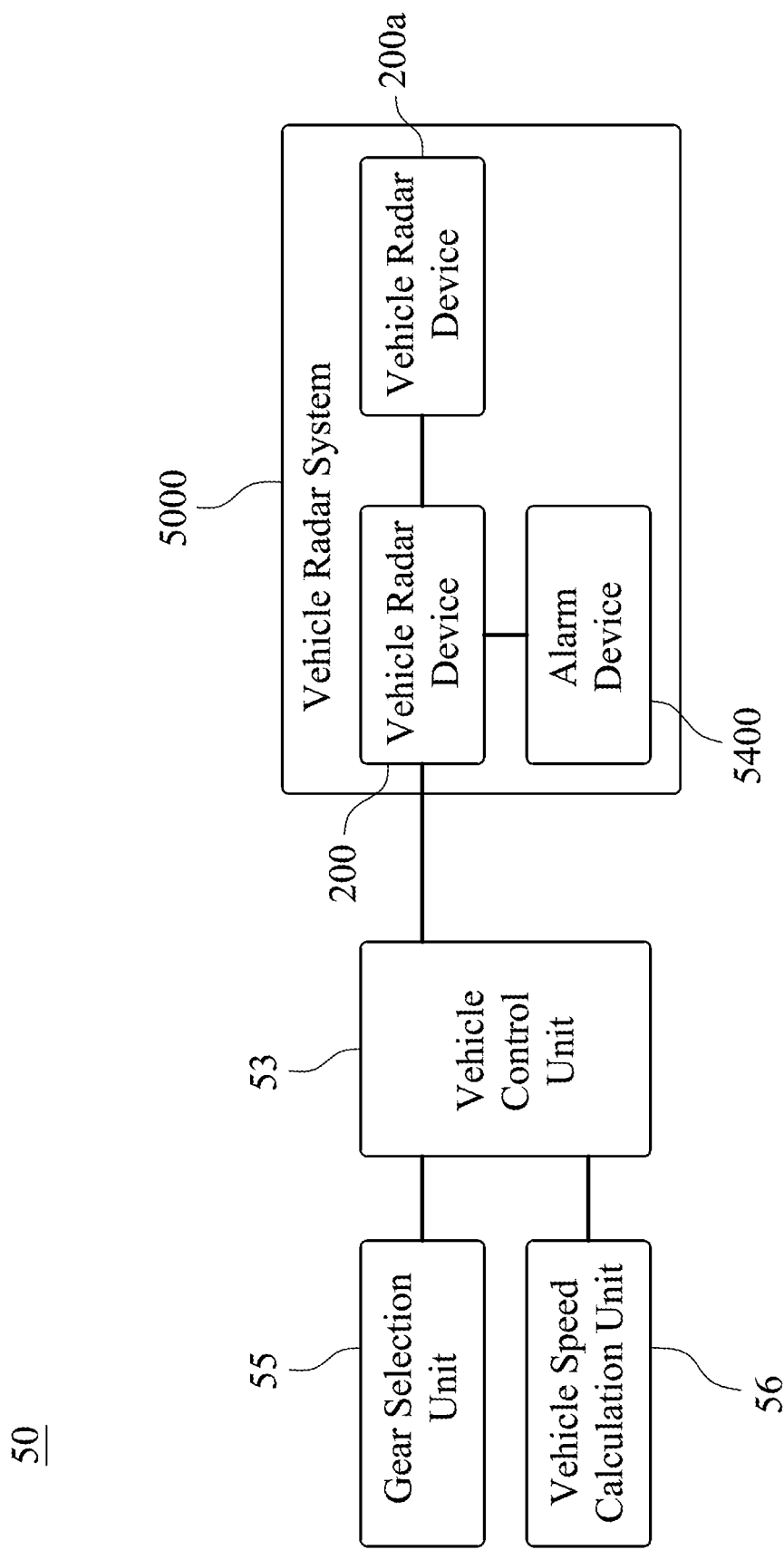
FIG. 5A is a block diagram of a vehicle radar system according to the 5th embodiment of the present disclosure, disposed in a vehicle.
Figure 5B:
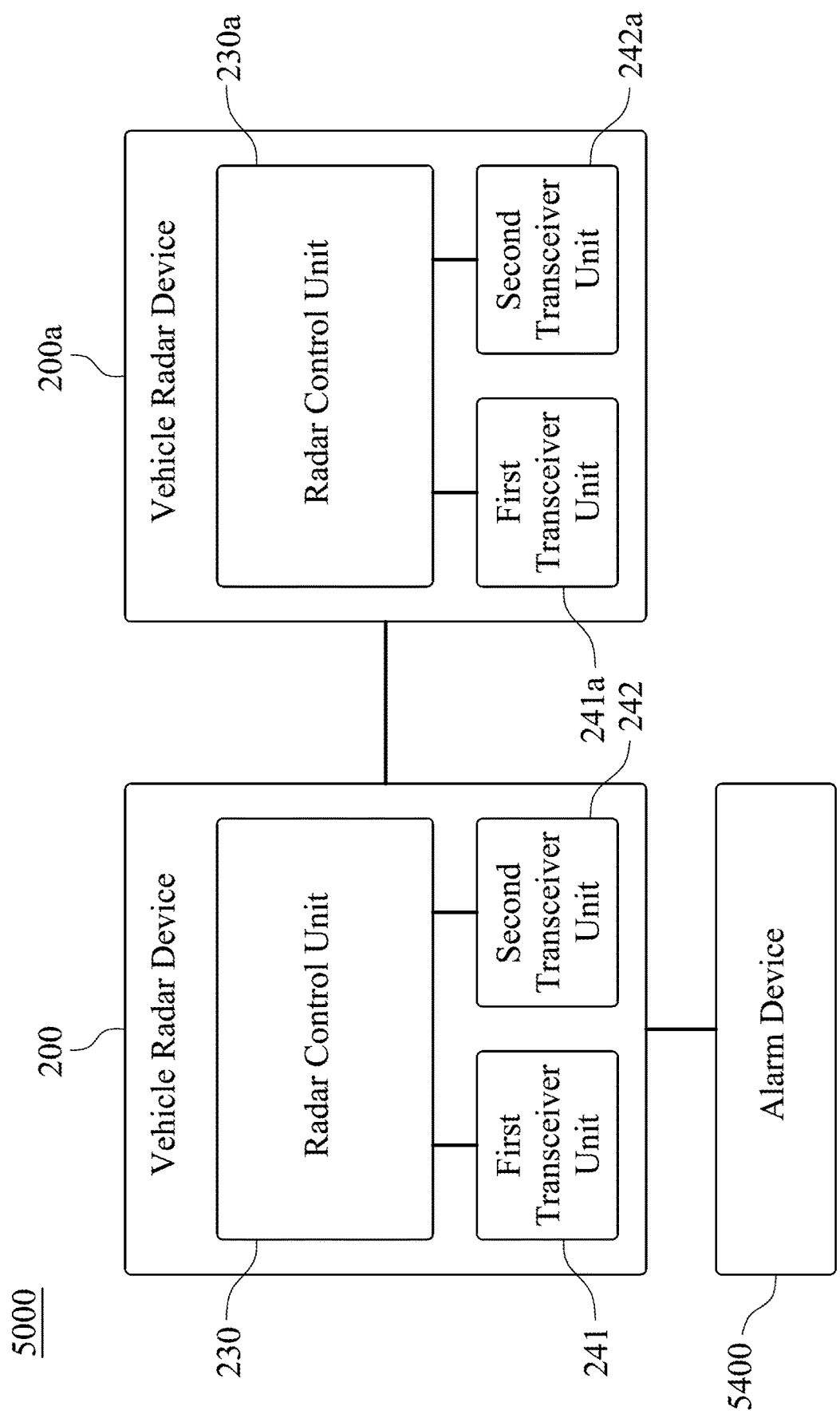
FIG. 5B is a block diagram of the vehicle radar system according to the 5th embodiment.

FIG. 5A is a block diagram of a vehicle radar system 5000 according to the 5th embodiment of the present disclosure, which is disposed in a vehicle 50. FIG. 5B is a block diagram of the vehicle radar system 5000 according to the 5th embodiment. In FIG. 2, FIG. 5A and FIG. 5B, the vehicle radar system 5000 is disposed in the vehicle 50 and includes two vehicle radar devices, i.e. vehicle radar devices 200a and 200 recited in the aforementioned 2nd embodiment, which are respectively disposed at a left-rear corner and a right-rear corner of the vehicle 50. The vehicle radar device 200a may be featured the same as those of the vehicle radar device 200, which are recited in the aforementioned 2nd embodiment.

The vehicle radar device 200 includes the radar control unit 230, a first transceiver unit 241 and a second transceiver unit 242. The first transceiver unit 241 is communicatively connected to the radar control unit 230 and includes the first antenna array 251, and the second transceiver unit 242 is communicatively connected to the radar control unit 230 and includes the second antenna array 252. The vehicle radar device 200a includes a radar control unit 230a, a first transceiver unit 241a and a second transceiver unit 242a. The first transceiver unit 241a is communicatively connected to the radar control unit 230a and includes a first antenna array (not shown in drawings), and the second transceiver unit 242a is communicatively connected to the radar control unit 230a and includes a second antenna array (not shown in drawings). Specifically, each unit of the first transceiver units 241, 241a and the second transceiver units 242, 242a is in a detection mode when the vehicle 50 is in the start state. The radar control units 230, 230a are configured to determine if the vehicle 50 satisfies a first emergency condition (e.g. the first emergency condition recited in the 4th embodiment) in accordance with data from the first transceiver units 241, 241a. The radar control units 230, 230a are also configured to determine and if the vehicle 50 satisfies a second emergency condition (e.g. the second emergency condition recited in the 4th embodiment) in accordance with data from the second transceiver units 242, 242a. The vehicle radar system 5000 further includes an alarm device 5400 communicatively connected to the radar control units 230, 230a (specifically, the alarm device 5400 is communicatively connected to the radar control unit 230a via the radar control unit 230). The alarm device 5400 is controlled by the radar control units 230, 230a to generate an alarm signal when the vehicle 50 is in a forward state according to data of a vehicle control unit 53, a gear selection unit 55 and a vehicle speed calculation unit 56 and satisfies the first emergency condition, and the alarm device 5400 is controlled by the radar control units 230, 230a to generate another alarm signal when the vehicle 50 is in a reverse state and satisfies the second emergency condition. Therefore, all of the first transceiver units 241, 241a and the second transceiver units 242, 242a transmit and receive signals, i.e. continue to operate, when the vehicle 50 is in the start state, instead of being activated based on the gear selection. Furthermore, an alarm signal associated to the BSD, LCA functions or an alarm signal associated to the reversing detection function can be selected to generate by the alarm device 5400 according to the gear selection, so that a switching circuit for switching among transceiver units or among antenna channels (selecting first antenna array or second antenna array) can be omitted.

In addition, regarding the vehicle radar system 5000 of the 5th embodiment, except the characteristics recited in the last paragraph being different from the characteristics recited in the aforementioned 4th embodiment, the other characteristics of the vehicle radar system 5000 may be the same as the corresponding characteristics of the vehicle radar system 4000.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A vehicle radar device, comprising:
a radar control unit;
a first antenna array communicatively connected to the radar control unit, wherein the first antenna array comprises a plurality of first transmitting elements and a plurality of first receiving elements;
a second antenna array communicatively connected to the radar control unit, wherein the second antenna array comprises a plurality of second transmitting elements and a plurality of second receiving elements;

a first circuit board, wherein the first antenna array is a plurality of circuit board antennas and disposed on the first circuit board; and a second circuit board, wherein the second antenna array is a plurality of circuit board antennas and disposed on the second circuit board;

wherein an angle between the first circuit board and the second circuit board is P12, and the following condition is satisfied:

60 degrees≤P12<180 degrees.

2. The vehicle radar device of claim 1, further comprising:

a third circuit board, wherein the radar control unit is disposed on the third circuit board, and only one of the first circuit board and the second circuit board is parallel to the third circuit board.

3. The vehicle radar device of claim 1, wherein an operating frequency of the first antenna array and an operating frequency of the second antenna array are both greater than 10 GHz, and each of the first transmitting elements, each of the first receiving elements, each of the second transmitting elements and each of the second receiving elements is a microstrip antenna and has a length smaller than 40 mm.

4. The vehicle radar device of claim 1, wherein the second transmitting elements are a plurality of second narrow-angle transmitting elements and a plurality of second wide-angle transmitting elements, the radar control unit is for switching the second narrow-angle transmitting elements or the second wide-angle transmitting elements to operate, the second receiving elements are a plurality of second narrow-angle receiving elements and a plurality of second wide-angle receiving elements, and the radar control unit is for switching the second narrow-angle receiving elements or the second wide-angle receiving elements to operate.

5. A vehicle radar system, disposed in a vehicle and comprising at least one vehicle radar device, the at least one vehicle radar device comprising:

a radar control unit;

a first transceiver unit communicatively connected to the radar control unit and comprising a first antenna array, wherein the first antenna array comprises a plurality of first transmitting elements and a plurality of first receiving elements; and a second transceiver unit communicatively connected to the radar control unit and comprising a second antenna array, wherein the second antenna array comprises a plurality of second transmitting elements and a plurality of second receiving elements;

wherein an angle between a centerline of a horizontal main lobe of the first transmitting elements and a centerline of a horizontal main lobe of the second transmitting elements is T12, an angle between a centerline of a horizontal main lobe of the first receiving elements and a centerline of a horizontal main lobe of the second receiving elements is R12, and the following conditions are satisfied:

0 degrees<T12≤90 degrees; and 0 degrees<R12≤90 degrees.

6. The vehicle radar system of claim 5, wherein the at least one vehicle radar device further comprises:

a first circuit board, wherein the first antenna array is a plurality of circuit board antennas and disposed on the first circuit board; and a second circuit board, wherein the second antenna array is a plurality of circuit board antennas and disposed on the second circuit board.

7. The vehicle radar system of claim 6, wherein the at least one vehicle radar device further comprises:

a third circuit board, wherein the radar control unit is disposed on the third circuit board, and only one of the first circuit board and the second circuit board is parallel to the third circuit board.

8. The vehicle radar system of claim 6, wherein an operating frequency of the first antenna array and an operating frequency of the second antenna array are both greater than 10 GHz, and each of the first transmitting elements, each of the first receiving elements, each of the second transmitting elements and each of the second receiving elements is a microstrip antenna extending along a horizontal direction of the vehicle and has a length smaller than 40 mm.

9. The vehicle radar system of claim 6, wherein a number of the at least one vehicle radar device is two, the two vehicle radar devices are respectively disposed at a left-rear corner and a right-rear corner of the vehicle, the two first circuit boards respectively of the two vehicle radar devices face a left direction and a right direction of the vehicle, respectively, and are disposed symmetrically relative to a longitudinal centerline of the vehicle, and the two second circuit boards respectively of the two vehicle radar devices both face a rear direction of the vehicle and are disposed symmetrically relative to the longitudinal centerline of the vehicle.

10. The vehicle radar system of claim 9, wherein the second transmitting elements of each of the two vehicle radar devices are a plurality of second narrow-angle transmitting elements and a plurality of second wide-angle transmitting elements, each of the two radar control units respectively of the two vehicle radar devices is for switching the second narrow-angle transmitting elements or the second wide-angle transmitting elements to operate, the second receiving elements of each of the two vehicle radar devices are a plurality of second narrow-angle receiving elements and a plurality of second wide-angle receiving elements, and each of the two radar control units is for switching the second narrow-angle receiving elements or the second wide-angle receiving elements to operate;

wherein an angle of a central blind zone defined by radiation patterns of the second narrow-angle receiving elements of the two vehicle radar devices respectively disposed at the left-rear corner and the right-rear corner is NT2, an angle of a central blind zone defined by radiation patterns of the second wide-angle receiving elements of the two vehicle radar devices respectively disposed at the left-rear corner and the right-rear corner is WT2, and the following conditions are satisfied:

15 degrees≤NT2≤120 degrees; and 60 degrees≤WT2≤175 degrees.

11. The vehicle radar system of claim 9, wherein a transmitting signal of the two second transceiver units respectively of the two vehicle radar devices is generated with at least one of a time division multiplexing manner, a frequency division multiplexing manner and an orthogonal signal manner controlled by the two radar control units respectively of the two vehicle radar devices.

12. The vehicle radar system of claim 9, wherein one of the two vehicle radar devices is communicatively connected to a vehicle control unit of the vehicle via the other one of the two vehicle radar devices.

13. The vehicle radar system of claim 9, wherein the radar control unit of each of the two vehicle radar devices comprises:

a switching circuit configured to switch the first transceiver unit or the second transceiver unit to be in a detection mode, wherein only the first transceiver unit is in the detection mode when the vehicle is in a forward state, and only the second transceiver unit is in the detection mode when the vehicle is in a reverse state.

14. The vehicle radar system of claim 9, wherein each unit of the two first transceiver units and the two second transceiver units of the two vehicle radar devices is in a detection mode when the vehicle is in a start state, the two radar control units respectively of the two vehicle radar devices are configured to determine if the vehicle satisfies a first emergency condition in accordance with data from the two first transceiver units respectively of the two vehicle radar devices, and if the vehicle satisfies a second emergency condition in accordance with data from the two second transceiver units respectively of the two vehicle radar devices;

wherein the vehicle radar system further comprises an alarm device communicatively connected to the two radar control units, the alarm device is controlled by the two radar control units to generate an alarm signal when the vehicle is in a forward state and satisfies the first emergency condition, and the alarm device is controlled by the two radar control units to generate another alarm signal when the vehicle is in a reverse state and satisfies the second emergency condition.

15. The vehicle radar system of claim 5, wherein a half power beam width of the horizontal main lobe of the first receiving elements is RA1, and the following condition is satisfied:

75 degrees≤RA1<180 degrees.

16. The vehicle radar system of claim 5, wherein the angle between the centerline of the horizontal main lobe of the first receiving elements and the centerline of the horizontal main lobe of the second receiving elements is R12, and the following condition is satisfied:

15 degrees≤R12≤75 degrees.

17. A vehicle radar system, disposed in a vehicle and comprising at least one vehicle radar device, the at least one vehicle radar device disposed at one of four corners of the vehicle and comprising:
a radar control unit;
a first antenna array communicatively connected to the radar control unit;
a second antenna array communicatively connected to the radar control unit;
a first circuit board vertical to a horizontal direction of the vehicle, wherein the first antenna array is a plurality of circuit board antennas and disposed on the first circuit board; and a second circuit board vertical to the horizontal direction of the vehicle, wherein the second antenna array is a plurality of circuit board antennas and disposed on the second circuit board;
wherein an angle between the first circuit board and the second circuit board is P12, and the following condition is satisfied:

90 degrees≤P12<180 degrees.

18. The vehicle radar system of claim 17, wherein a number of the at least one vehicle radar device is two, the two vehicle radar devices are respectively disposed at a left-rear corner and a right-rear corner of the four corners of the vehicle, the two first circuit boards respectively of the two vehicle radar devices face a left direction and a right direction of the vehicle, respectively, and are disposed symmetrically relative to a longitudinal centerline of the vehicle, and the two second circuit boards respectively of the two vehicle radar devices both face a rear direction of the vehicle and are disposed symmetrically relative to the longitudinal centerline of the vehicle.

19. The vehicle radar system of claim 18, wherein the second antenna array of each of the two vehicle radar devices comprises a plurality of second transmitting elements and a plurality of second receiving elements, the second transmitting elements are a plurality of second narrow-angle transmitting elements and a plurality of second wide-angle transmitting elements, each of the two radar control units respectively of the two vehicle radar devices is for switching the second narrow-angle transmitting elements or the second wide-angle transmitting elements to operate, the second receiving elements of each of the two vehicle radar devices are a plurality of second narrow-angle receiving elements and a plurality of second wide-angle receiving elements, and each of the two radar control units is for switching the second narrow-angle receiving elements or the second wide-angle receiving elements to operate;

wherein an angle of a central blind zone defined by radiation patterns of the second narrow-angle receiving elements of the two vehicle radar devices respectively disposed at the left-rear corner and the right-rear corner is NT2, an angle of a central blind zone defined by radiation patterns of the second wide-angle receiving elements of the two vehicle radar devices respectively disposed at the left-rear corner and the right-rear corner is WT2, and the following conditions are satisfied:

15 degrees≤NT2≤120 degrees; and
60 degrees≤WT2≤175 degrees.

20. The vehicle radar system of claim 17, wherein the angle between the first circuit board and the second circuit board is P12, and the following condition is satisfied:

105 degrees≤P12≤165 degrees.

* * * * *